(12) United States Patent
Lee et al.

(10) Patent No.: US 11,310,441 B2
(45) Date of Patent: Apr. 19, 2022

(54) ELECTRONIC DEVICE FOR GENERATING A BACKGROUND IMAGE FOR A DISPLAY APPARATUS AND OPERATION METHOD THEREOF

(71) Applicant: SAMSUNG ELECTRONICS CO., LTD., Suwon-si (KR)

(72) Inventors: Insun Lee, Suwon-si (KR); Yunho Lee, Suwon-si (KR); Kwansik Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/961,595

(22) PCT Filed: Jan. 29, 2019

(86) PCT No.: PCT/KR2019/001219
§ 371 (c)(1),
(2) Date: Jul. 10, 2020

(87) PCT Pub. No.: WO2019/160260
PCT Pub. Date: Aug. 22, 2019

(65) Prior Publication Data
US 2020/0374472 A1 Nov. 26, 2020

(30) Foreign Application Priority Data
Feb. 13, 2018 (KR) .................. 10-2018-0018061

(51) Int. Cl.
*H04N 5/262* (2006.01)
*G06K 9/00* (2006.01)
(Continued)

(52) U.S. Cl.
CPC ....... *H04N 5/2628* (2013.01); *G06K 9/00624* (2013.01); *H04N 5/23229* (2013.01); *H04N 5/265* (2013.01); *H04N 21/422* (2013.01)

(58) Field of Classification Search
CPC .. H04N 5/2628; H04N 5/23229; H04N 5/265; H04N 21/422; H04N 21/4131;
(Continued)

(56) References Cited

U.S. PATENT DOCUMENTS 8,731,301 B1   5/2014   Bushman et al.
9,947,526 B2   4/2018   Shinoda et al.
(Continued)

FOREIGN PATENT DOCUMENTS

EP    2 570 986 A1   3/2013
EP    3 316 570 A1   5/2018
(Continued)

OTHER PUBLICATIONS

Communication dated Apr. 30, 2021 issued by the Korean Intellectual Property Office in counterpart Korean Application No. 10-2018-0018061.
(Continued)

*Primary Examiner* — Albert H Cutler
(74) *Attorney, Agent, or Firm* — Sughrue Mion, PLLC

(57) ABSTRACT

An electronic device and an operating method thereof are provided. The electronic device includes: a camera; a display; a communication interface; a memory storing one or more instructions; and a processor configured to execute the one or more instructions stored in the memory to: generate an event to instruct a plurality of markers to be displayed on a screen of a display apparatus and transmit the generated event to the display apparatus; determine, from among images obtained from the camera, an image from which at least a region of a wall surface in the vicinity of the display
(Continued)

apparatus is to be extracted, via recognition of the plurality of markers displayed on the screen of the display apparatus in response to the generated event; extract, from the determined image, a region corresponding to a shape obtained based on the recognized plurality of markers; generate a background image to be displayed on the screen of the display apparatus, by correcting an image of the extracted region; and transmit the generated background image to the display apparatus so that the generated background image is displayed on the screen of the display apparatus.

15 Claims, 23 Drawing Sheets

(51) Int. Cl.
*H04N 5/232* (2006.01)
*H04N 21/422* (2011.01)
*H04N 21/41* (2011.01)
*H04N 5/272* (2006.01)
*H04N 5/44* (2011.01)
*H04N 21/4223* (2011.01)
*H04N 21/44* (2011.01)
*H04N 21/81* (2011.01)
*H04N 5/265* (2006.01)

(58) Field of Classification Search
CPC ......... H04N 21/44008; H04N 21/4223; H04N 21/8153; H04N 21/4126; H04N 5/23222; H04N 5/232945; H04N 5/4448; H04N 5/272; H04N 21/4222; H04N 5/23206; H04N 5/232939; G06K 9/00624
See application file for complete search history.

(56) References Cited

U.S. PATENT DOCUMENTS

| | | | |
|---|---|---|---|
| 10,120,635 B2 | 11/2018 | Yoganandan et al. | |
| 10,229,543 B2* | 3/2019 | Hato | G06T 11/001 |
| 10,467,933 B2 | 11/2019 | Hur et al. | |
| 10,754,511 B2 | 8/2020 | Birkbeck et al. | |
| 2007/0022215 A1 | 1/2007 | Singer et al. | |
| 2011/0187731 A1 | 8/2011 | Tsuchida | |
| 2012/0013646 A1* | 1/2012 | Ichioka | H04N 5/44 345/690 |
| 2014/0177965 A1* | 6/2014 | Hamada | G06K 9/46 382/192 |
| 2014/0307084 A1 | 10/2014 | Zontrop et al. | |
| 2014/0313117 A1 | 10/2014 | Addy et al. | |
| 2014/0341280 A1 | 11/2014 | Yang et al. | |
| 2016/0239096 A1* | 8/2016 | Okuno | H04N 21/42222 |
| 2017/0220209 A1 | 8/2017 | Bae | |
| 2017/0262247 A1 | 9/2017 | Yoganandan et al. | |

FOREIGN PATENT DOCUMENTS

| | | |
|---|---|---|
| EP | 3 337 161 A1 | 6/2018 |
| EP | 3 720 111 A1 | 10/2020 |
| KR | 10-2011-0051072 A | 5/2011 |
| KR | 10-2012-0080646 A | 7/2012 |
| KR | 10-2014-0060365 A | 5/2014 |
| KR | 10-2016-0085346 A | 7/2016 |
| KR | 10-2017-0050995 A | 5/2017 |
| KR | 10-2017-0092312 A | 8/2017 |
| KR | 10-2017-0105445 A | 9/2017 |
| WO | 2016/124146 A1 | 8/2016 |
| WO | 2016/125708 A1 | 8/2016 |
| WO | WO2016012414 * | 8/2016 |
| WO | 2017/078356 A1 | 5/2017 |

OTHER PUBLICATIONS

Communication dated Mar. 12, 2021 issued by the European Intellectual Property Office in counterpart European Application No. 19754992.6.

Communication dated May 10, 2019 issued by the International Searching Authority in counterpart Application No. PCT/KR2019/001219 (PCT/ISA/220, PCT/ISA/210, and PCT/ISA/237).

Communication dated Nov. 29, 2021 issued by the Korean Intellectual Property Office in counterpart English Korean Application No. 10-2018-0018061.

* cited by examiner

FIG. 2
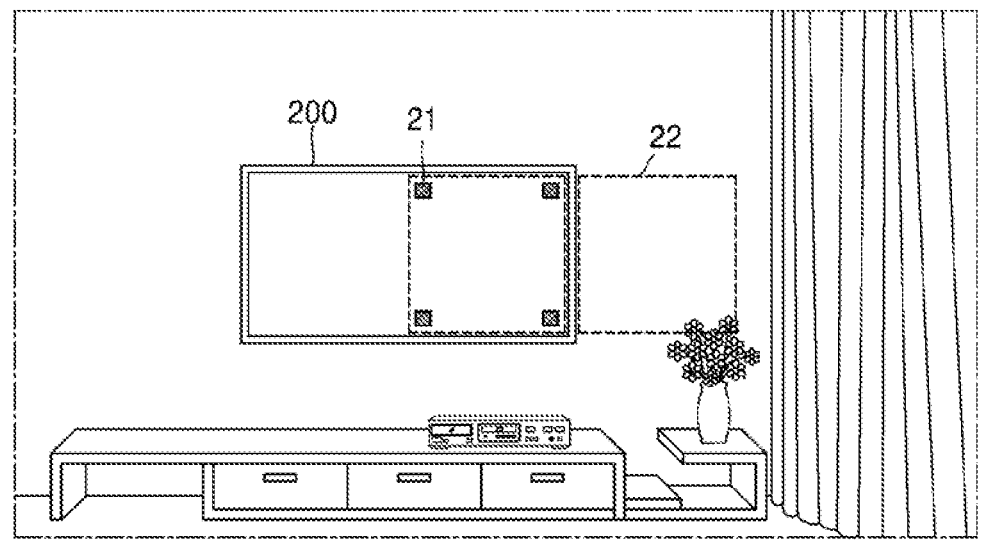
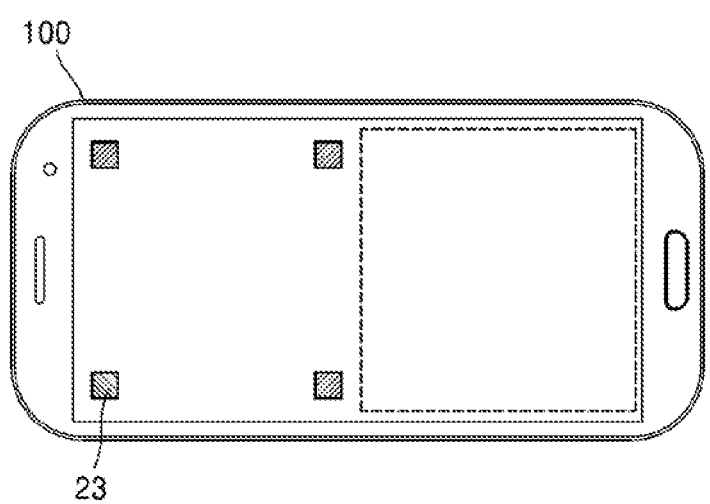

FIG. 3
(a)
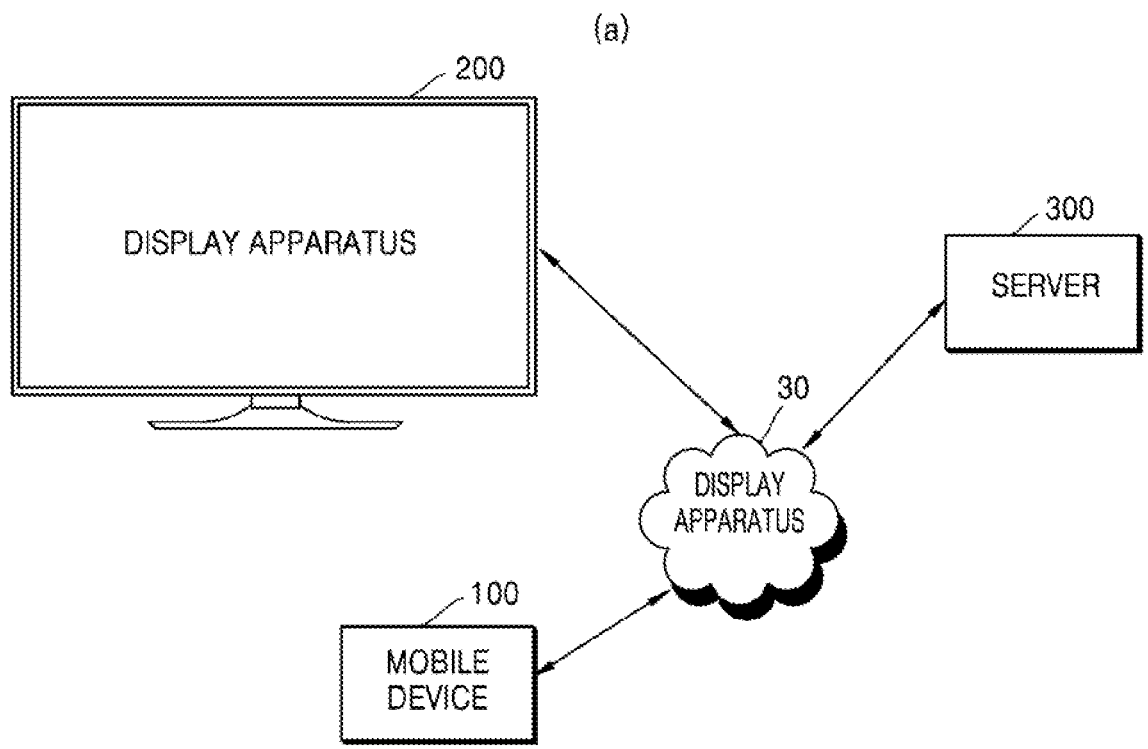
(b)
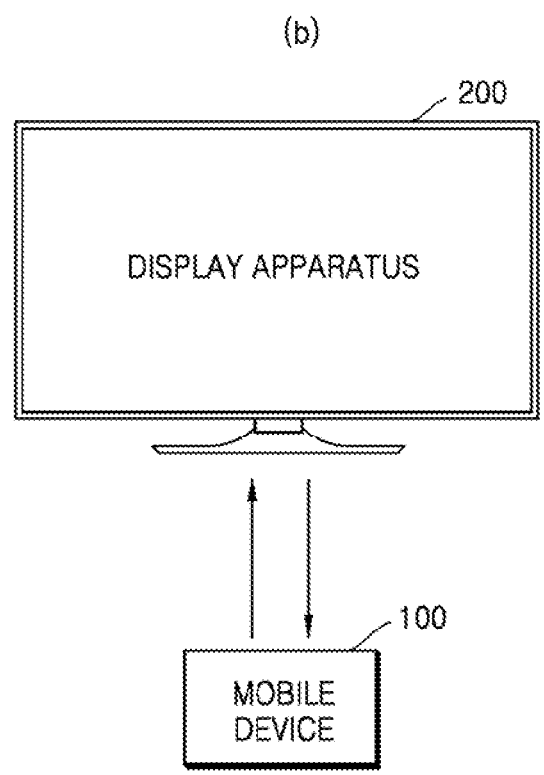

FIG. 10
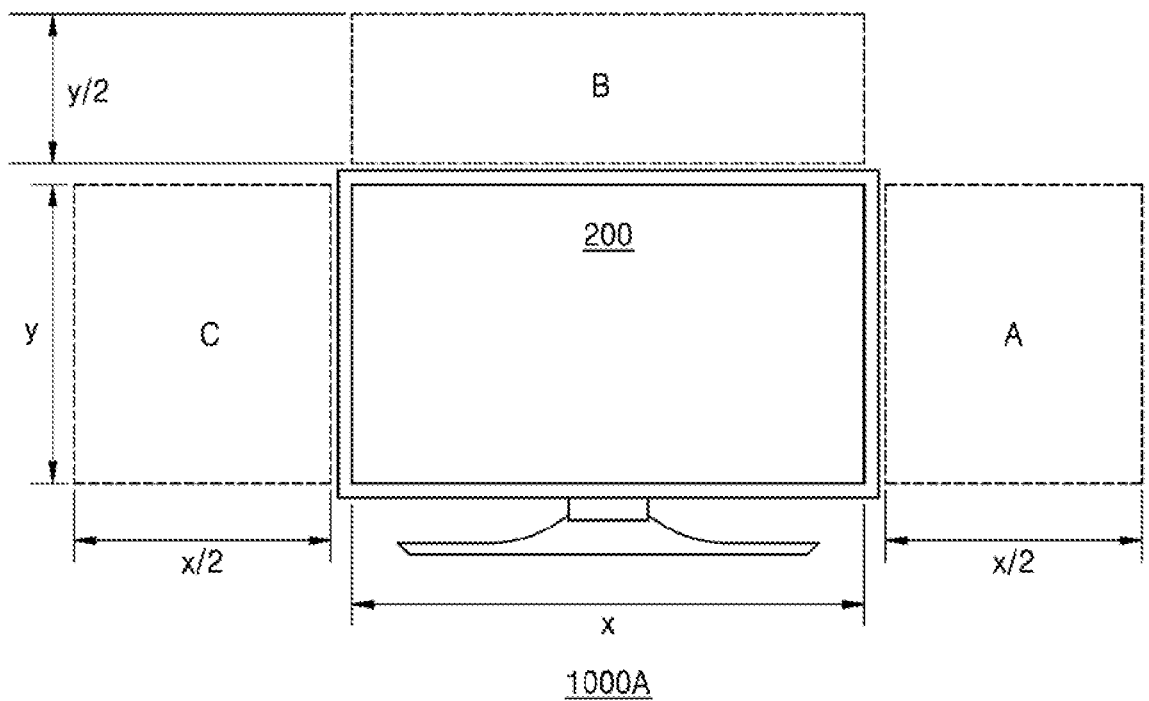
1000A
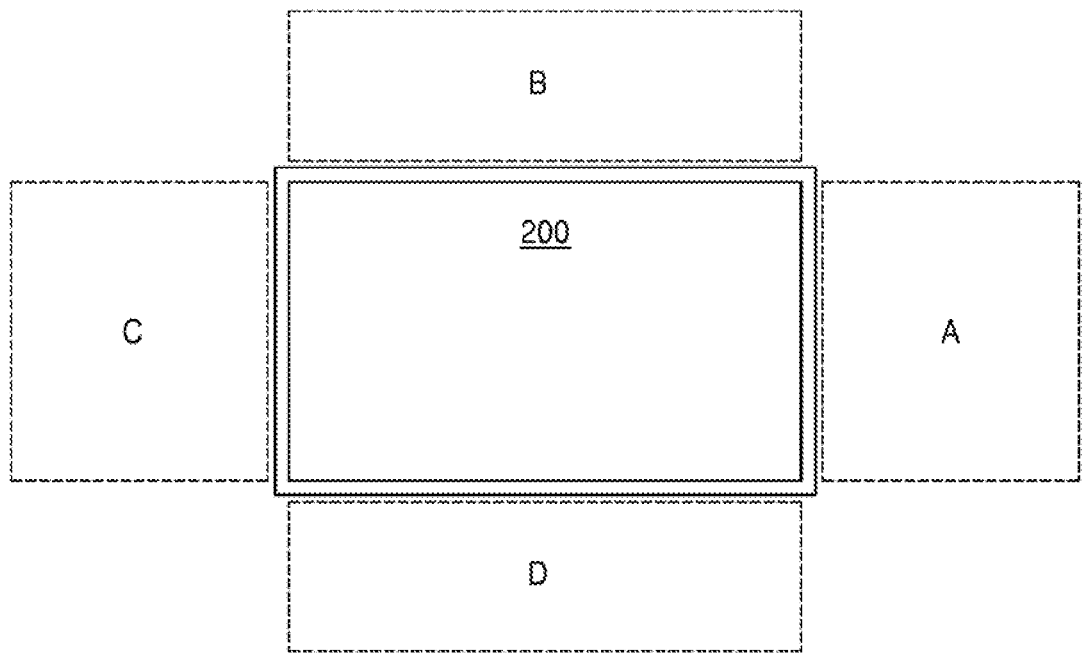
1000B

FIG. 11
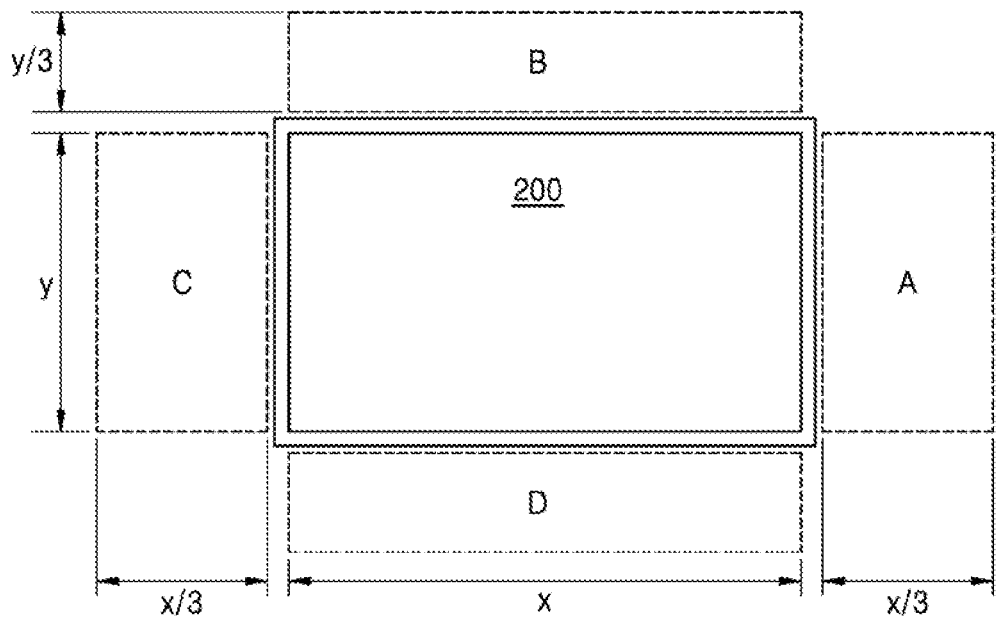
1100A
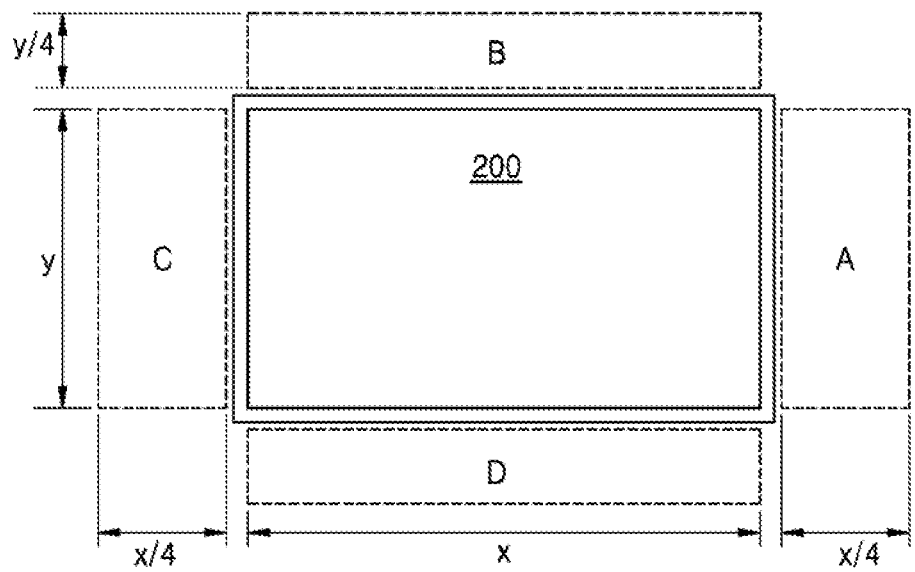
1100B

ELECTRONIC DEVICE FOR GENERATING A BACKGROUND IMAGE FOR A DISPLAY APPARATUS AND OPERATION METHOD THEREOF

TECHNICAL FIELD

Various embodiments relate to an electronic device and an operating method thereof, and more particularly, to an electronic device configured to enable a display apparatus to display a wall surface image and an operating method of the electronic device.

BACKGROUND ART

An image display apparatus is an apparatus having a function to display an image to be viewed by a user. A user may view broadcasting programs via the image display apparatus. The image display apparatus displays, on a display thereof, a broadcasting program from broadcasting signals selected by a user, wherein the broadcasting signals are transmitted from a broadcasting station. Currently, broadcasting is shifting from analog broadcasting to digital broadcasting.

Digital broadcasting refers to broadcasting in which digital images and sound signals are transmitted. Digital broadcasting is less vulnerable to external noise than analog broadcasting, and thus has little data loss, is well-suited for error correction, has high resolution, and provides a vivid picture. Also, unlike analog broadcasting, digital broadcasting is capable of two-way services.

Smart televisions providing content of many sorts in addition to a digital broadcasting function have been provided. Smart televisions do not passively operate according to a selection of a user. Instead, it is aimed at analyzing and providing user needs without a manipulation by the user.

What is more, to enhance the interior effects of an environment in which a television is installed, a wall-hanging television that is mounted on a wall surface, or a framed television providing the aesthetic sense of a frame has been introduced.

DESCRIPTION OF EMBODIMENTS

Technical Problem

Various embodiments provide a method and an apparatus for displaying a wall surface image on a screen of a television for enhancing an aesthetic sense of an environment in which the television is mounted.

Solution to Problem

The disclosure provides an operating method of an electronic device, the operating method including: generating an event and transmitting the generated event to a display apparatus, the event being configured to instruct a plurality of markers to be displayed on a screen of the display apparatus; determining, from among images obtained from a camera, an image, from which at least a region of a wall surface in the vicinity of the display apparatus is to be extracted, via recognition of the plurality of markers displayed on the screen of the display apparatus in response to the generated event; extracting, from the determined image, a region corresponding to a shape obtained based on the recognized plurality of markers; generating a background image to be displayed on the screen of the display apparatus, by correcting an image of the extracted region; and transmitting the generated background image to the display apparatus so that the generated background image is displayed on the screen of the display apparatus.

Advantageous Effects of Disclosure

When a display apparatus is mounted according to embodiments, wall surface images may be effectively captured and processed to generate a background image to be displayed on the display apparatus, and thus, an aesthetic sense of an environment, in which the display apparatus is mounted, may be enhanced.

BRIEF DESCRIPTION OF DRAWINGS

FIG. 2 is a reference view for describing a method of displaying a wall surface image on a display apparatus, according to an embodiment.

FIG. 3 is a schematic view for describing examples of a system configured to display a wall surface image on a display apparatus, according to embodiments.

FIG. 10 shows a region to be captured of a wall surface in the vicinity of a display apparatus, according to an embodiment.

FIG. 11 is a reference view for describing a size of a region to be captured of a wall surface in the vicinity of a display apparatus, according to an embodiment.

BEST MODE

Figure 1:
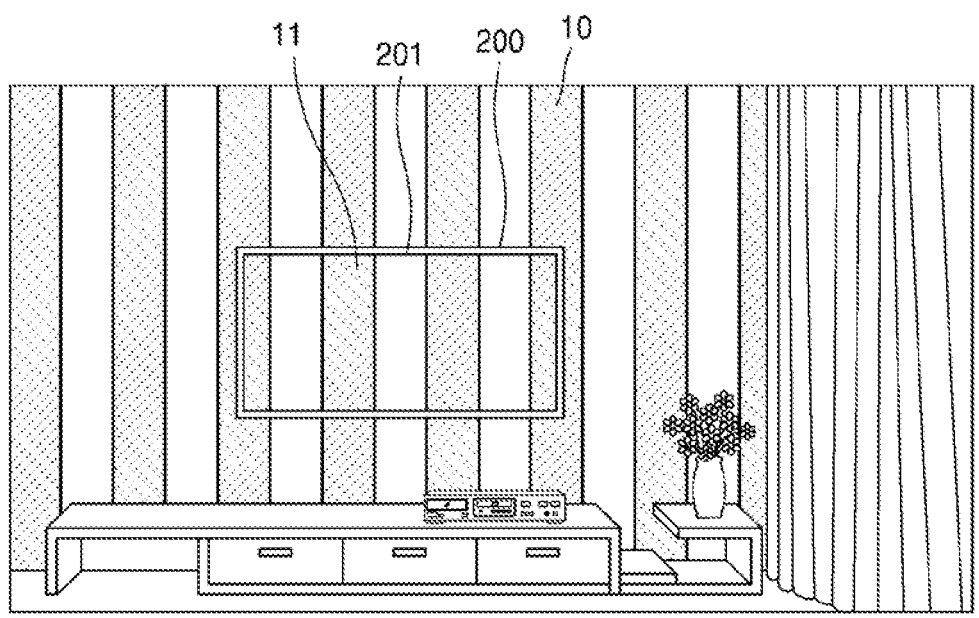
FIG. 1 is a reference view for describing a concept of displaying a wall surface image on a display apparatus according to embodiments.

According to an embodiment, an electronic device includes: a camera; a display; a communication interface; a memory storing one or more instructions; and a processor configured to execute the one or more instructions stored in the memory to: generate an event and transmit, to a display apparatus, the generated event to instruct a plurality of markers to be displayed on a screen of the display apparatus; determine, from among images obtained from the camera, an image, from which at least a region of a wall surface in the vicinity of the display apparatus is to be extracted, based on recognition of the plurality of markers displayed on the screen of the display apparatus in response to the generated event; extract, from the determined image, a region corresponding to a shape obtained based on the recognized plurality of markers; generate a background image to be displayed on the screen of the display apparatus, by correcting an image of the extracted region; and transmit the generated background image to the display apparatus so that the generated background image is displayed on the screen of the display apparatus.

The processor may further be configured to execute the one or more instructions to: obtain size information of the screen of the display apparatus; and determine, based on the obtained size information, a location of the screen of the display apparatus on which the plurality of markers are to be displayed, and generate the event including information about the determined location.

The processor may further be configured to execute the one or more instructions to, when the plurality of markers displayed on the screen of the display apparatus are recognized, determine, from the images obtained from the camera, an image in which the plurality of markers exist, as an image, from which the background image is to be extracted.

The at least the region of the wall surface on which the display apparatus is mounted may include at least one of a left region, a right region, an upper region, and a lower region of the wall surface in the vicinity of the display apparatus.

The processor may further be configured to execute the one or more instructions to correct the image of the extracted region by performing at least one of adjusting of a length of at least one side of the image, rotating the image of the extracted region, and symmetrizing the image of the extracted region.

The processor may further be configured to execute the one or more instructions to generate the background image by combining an image generated by correcting the image of the extracted region with a symmetric image of the corrected image.

The processor may further be configured to execute the one or more instructions to: when the determined image is an image obtained from a left region or a right region of the wall surface in the vicinity of the display apparatus, obtain the symmetric image by symmetrizing the obtained image in a left direction or a right direction; and when the determined image is an image obtained from an upper region or a lower region of the wall surface in the vicinity of the display apparatus, obtain the symmetric image by symmetrizing the obtained image in an upper direction or a lower direction.

The processor may further be configured to execute the one or more instructions to transmit the event and the background image to the display apparatus via a server.

The shape obtained based on the recognized plurality of markers may include a polygonal shape obtained by connecting the recognized plurality of markers.

According to an embodiment, an operating method of an electronic device includes: generating an event to instruct a plurality of markers to be displayed on a screen of a display apparatus and transmitting the generated event to the display apparatus; determining, from among images obtained from a camera, an image, from which at least a region of a wall surface in the vicinity of the display apparatus is to be extracted, via recognition of the plurality of markers displayed on the screen of the display apparatus in response to the generated event; extracting, from the determined image, a region corresponding to a shape obtained based on the recognized plurality of markers; generating a background image to be displayed on the screen of the display apparatus, by correcting an image of the extracted region; and transmitting the generated background image to the display apparatus so that the generated background image is displayed on the screen of the display apparatus.

According to an embodiment, a computer-readable recording medium has recorded thereon a program for executing an operating method of a display apparatus on a computer.

MODE OF DISCLOSURE

FIG. 1 is a reference view for describing a concept of displaying a wall surface image on a display apparatus according to embodiments.

Referring to FIG. 1, a display apparatus 200 is mounted on a wall surface 10. The display apparatus 200 according to an embodiment may display an image 11 of a region of the wall surface 10, in a state other than a normal operation mode of the display apparatus 200, in which content is displayed based on a user input. In a state in which a user does not manipulate and use the display apparatus 200, the display apparatus 200 may display the image 11 of a region of the wall surface 10, and thus, an aesthetic sense of an environment in which the display apparatus 200 is mounted may be enhanced. Also, by making a bezel 201 of the display apparatus 200 slimmer or by realizing the bezel 201 as a color not recognizable to the human eye, a user may be provided with an experience as if the display apparatus 200 does not exist on the wall surface 10, while the display apparatus 200 is not operating. A television (TV) providing this effect may be referred to as a glass TV.

When the display apparatus 200 displays the image 11 of the wall surface, the user may have a more authentic experience in which the display apparatus 200 is felt like a wall surface, as the actual wall surface 10 and the image 11 of the wall surface that the display apparatus 200 displays are more smoothly connected. After the display apparatus 200 is mounted on the wall surface 10, it is difficult to identify a region of the wall surface 10, which is covered by the display apparatus 200. Thus, it is important to display the image 11 of the wall surface on the display apparatus 200 such that the image 11 appears as much as possible to be naturally connected with a peripheral region of the display apparatus 200 in a state in which the display apparatus 200 is mounted on the wall surface 10.

FIG. 2 is a reference view for describing a method of displaying a wall surface image on a display apparatus, according to an embodiment.

Referring to FIG. 2, the display apparatus 200 mounted on the wall surface 10 may display one or more markers 21.

A mobile device 100 may display one or more guides on a display of the mobile device 100. The mobile device 100 may capture an image of the wall surface 10 by using the one or more guides 23, and the one or more markers 21 displayed on the display apparatus 200. For example, when a user moves the mobile device 100 to locate the guides 23 of the mobile device 100 at the markers 21 displayed on the display apparatus 200, the mobile device 100 may capture the image of the wall surface. When the guides 23 are located at the markers 21, an image of a region 22 peripheral to the display apparatus 200 on the right side may be recognized at a right portion 24 of a region captured by the mobile device 100, and thus, the mobile device 100 may capture the region 22 of the wall surface 10. The region 22 is a region peripheral to the display apparatus 200 on the right side, and thus, the mobile device 100 may perform an appropriate processing operation by using a captured image of the region 22, to generate a wall surface image to be displayed on the display apparatus 200, that is, a background image. Also, the region 22 is a region directly adjacent to the display apparatus 200, and thus, when the image of the region 22 is used to generate the background image to be displayed on the display apparatus 200, it may be possible to generate an image smoothly harmonized with a peripheral region of the display apparatus 200.

The region 22 captured in FIG. 2, the region being peripheral to the display apparatus 200 on the right side, is an example. Regions to be captured may include any one of a left region, an upper region, and a lower region of the display apparatus 200.

Also, when a captured image is distorted, because a wall surface image is obliquely captured, the mobile device 100 may extract a region from the captured image and correct the region, by using a polygonal shape obtained by a marker detected from the display apparatus 200.

FIG. 3 is a schematic view for describing examples of a system configured to display a wall surface image on a display apparatus, according to embodiments.

Referring to (a) of FIG. 3, according to an embodiment, the system may include the mobile device 100, the display apparatus 200, and a server 300. The mobile device 100, the display apparatus 200, and the server 300 may communicate with one another via a communication network 30. The communication network 30 may include broadband networks according to various communication standards, such as Zigbee, 3rd generation (3G), 3rd generation partnership project (3GPP), long term evolution (LTE), etc.

The mobile device 100 may receive information about the display apparatus 200, in detail, information about a screen size, from the display apparatus 200 via the server 300, or from the server 300, and may generate a marker display event based on the received information.

The marker display event may be transmitted to the display apparatus 200 via the server 300, and when the display apparatus 200 receives the marker display event, the display apparatus 200 may display one or more markers on a screen in response to the marker display event. The markers may be displayed on various locations of the screen of the display apparatus 200.

The mobile device 100 may obtain an image of a wall surface in the vicinity of the display apparatus 200, by using the markers displayed on the display apparatus 200. The mobile device 100 may obtain an image of a peripheral region of the display apparatus 200 according to a location of the markers displayed on the screen of the display apparatus 200. For example, when the markers are displayed on a left half screen of the display apparatus 200, the mobile device 100 may obtain an image of a left peripheral region of the display apparatus 200.

The mobile device 100 may generate a background image to be displayed on the display apparatus 200 by using the obtained original image and a symmetric image obtained by symmetrizing the original image, and may transmit the generated background image to the display apparatus 200 via the server 300.

When the display apparatus 200 receives the background image via the server 300, the display apparatus 200 may display the background image on the screen.

Referring to (b) of FIG. 3, the system according to an embodiment may include the mobile device 100 and the display apparatus 200. The mobile device 100 and the display apparatus 200 may perform communication with each other via short-range wireless communication, etc. The short-range wireless communication may include short-range wireless communication protocols, such as Bluetooth, Bluetooth low energy (BLE), Wifi, Wifi-direct, near-field communication (NFC), infrared communication, laser beam communication, etc.

Because a server is not used, the mobile device 100 may directly receive screen information of the display apparatus 200 from the display apparatus 200 and may directly transmit a marker display event generated based on the received screen information to the display apparatus 200.

The display apparatus 200 may display one or more markers on the screen in response to the marker display event. The mobile device 100 may obtain an image of a peripheral wall surface of the display apparatus 200 by using the markers displayed on a screen of the display apparatus 200, generate a background image by using the obtained image, and transmit the generated background image to the display apparatus 200.

The display apparatus 200 may receive the background image and display the received background image on the screen.

Figure 4:
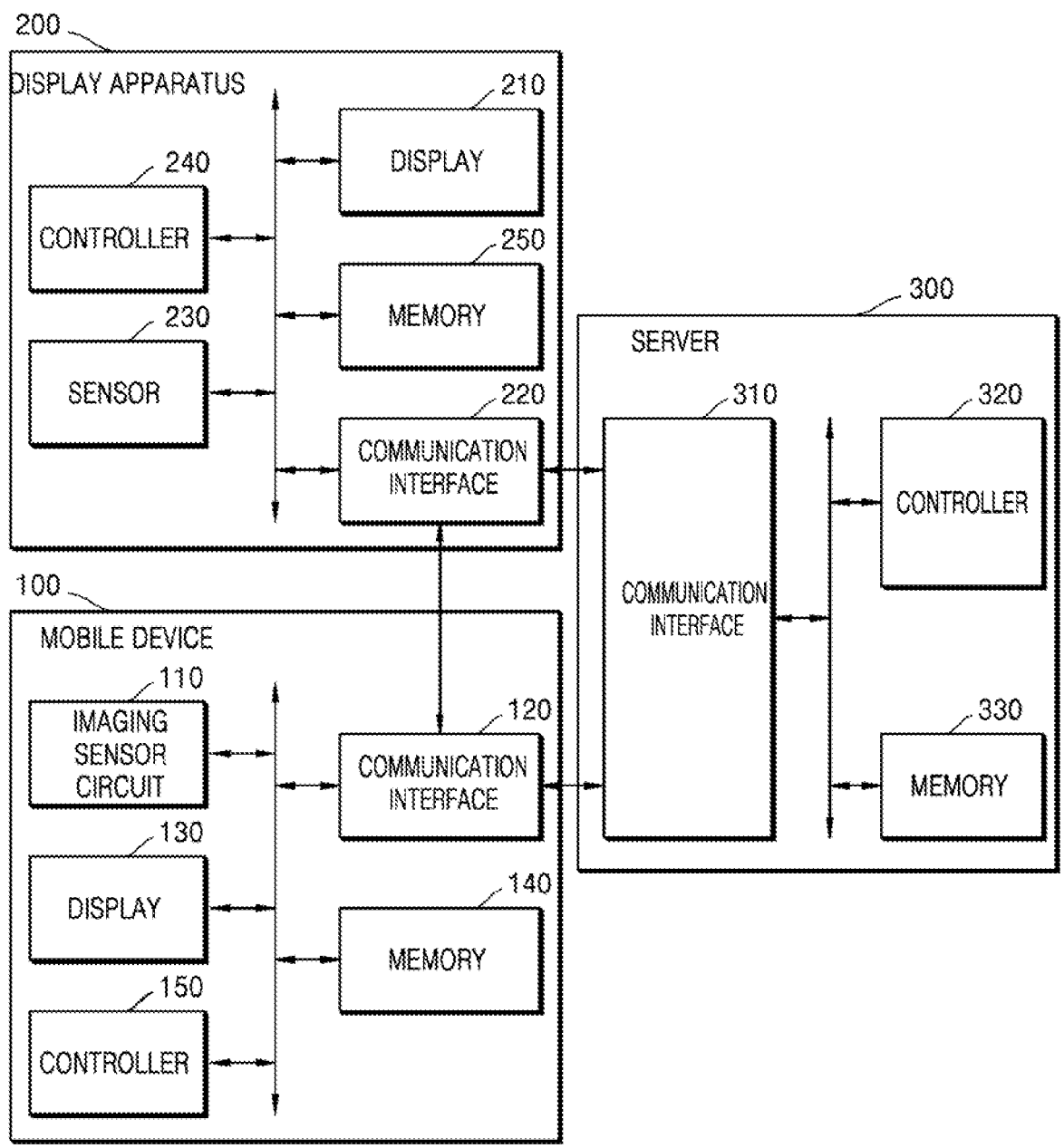
FIG. 4 is a block diagram of a mobile device 100, a display apparatus 200, and a server 300, according to an embodiment.

FIG. 4 is a block diagram of the mobile device 100, the display apparatus 200, and the server 300, according to an embodiment.

The display apparatus 200 may process content data received from various sources and display an image. The display apparatus 200 may receive a radio-frequency (RF) signal from a broadcasting station by using an RF antenna. The display apparatus 200 may receive content provided by a content provision server through a communication network based on an Internet protocol. The display apparatus 200 may receive content from an external device connected to the display apparatus 200 via various ports or an HDMI. The external device may include, for example, a set top box, a game device, a BD player, a PC, a USB, etc. In addition, the display apparatus 200 may receive content from a mobile device connected with the display apparatus 200 for communication or may obtain content data from a memory stored in the display apparatus 200 or connected for a local access.

The display apparatus 200 may include a display 210, a communication interface 220, a sensor 230, and a controller 240.

The display 210 may display, on a screen, content received from various sources, under control of the controller 240. Various sources may include, for example, a communication interface 220, a memory 250, and an inputter/outputter. The display 210 may include a PDP, an LCD, an OLED, a flexible display, etc. Also, the display 210 may include a three-dimensional (3D) display. Also, the display 210 may include a touch screen, which may be used as an input device as well as an output device.

The communication interface 220 may connect the display apparatus 200 with an external device, for example, the mobile device 100 or the server 300, under control of the controller 240. The communication interface 220 may include one or a combination of a wireless LAN, Bluetooth, and wired Ethernet in correspondence to the performance and the structure of a display apparatus. The communication interface 220 may further include other short-range communication interfaces, in addition to Bluetooth. For example, the communication interface 220 may further include NFC and BLE.

The sensor 230 may sense a voice of a user, an image of a user, or an interaction of a user and may include a microphone configured to receive an uttered voice of a user, a camera portion configured to receive an image corresponding to a motion of a user within a recognition range of a camera, the motion including a gesture, and a light receiver configured to receive a light signal (including a control signal) received from an external remote control device according to a user input. The sensor 230 may sense a command or a control signal from the remote control device via the light receiver and may transmit the sensed command or control signal to the controller 240. The remote control device may be realized as various types of devices for controlling the display apparatus 200. For example, the remote control device may be realized as a remote controller or a cellular phone.

The memory 250 may store various data, programs, or applications for operating and controlling the display apparatus 200 under control of the controller 240. The memory 250 may store an operating system for controlling the display apparatus 200 and a controller, an application initially provided from a manufacturer or downloaded from the outside, a graphical user interface (GUI) related to the application, an object (for example, an image, text, an icon, a button, etc.) for providing the GUI, user information, documents, databases, or related data.

The memory 250 may include ROM, RAM, or a memory card (for example, a micro SD card or a USB memory not shown) mounted in the display apparatus 200. Also, the memory 250 may include a nonvolatile memory, a volatile memory, a hard disk drive (HDD), or a solid state drive (SSD).

In particular, according to an embodiment, the memory 250 may include one or more instructions for transmitting information about the display apparatus 200 in response to a request of the mobile device 100 or the server 300. The information about the display apparatus 200 may include size information of the display apparatus 200, in detail, screen size information of the display apparatus 200.

According to an embodiment, the memory 250 may include one or more instructions for receiving a marker display event from the mobile device 100 or the server 300 and displaying one or more markers on the display in response to the marker display event.

According to an embodiment, the memory 250 may include one or more instructions for receiving a background image from the mobile device 100 or the server 300 and displaying the background image on the display. The background image may include an image generated by using a peripheral region of a wall surface on which the display apparatus 200 is mounted.

The controller 240 may control general operations of the display apparatus 200 and signal flows among the components of the display apparatus 200 and may process data. When there is a user input or a pre-set and stored condition is satisfied, the controller 240 may execute an operation system (OS) and various applications stored in the memory 250.

Processors used as the controller 240 may include a graphic processing unit (not shown) for processing graphics corresponding to a video. The processors may be realized as a system on chip (SoC) in which a core (not shown) and a GPU (not shown) are integrated. The processors may include a single core, a dual core, a triple core, a quad core, and a multi-core.

Also, the processors may include a plurality of processors. For example, the processors may be realized as a main processor (not shown) and a sub-processor (not shown) operating in a sleep mode.

The controller 240 according to an embodiment may execute the one or more instructions stored in the memory 250 to transmit the information about the display apparatus 200 in response to a request from the mobile device 100 or the server 300.

The controller 240 according to an embodiment may execute the one or more instructions stored in the memory 250 to receive a marker display event from the mobile device 100 or the server 300 and to display one or more markers on the display in response to the marker display event.

The controller 240 according to an embodiment may execute the one or more instructions stored in the memory 250 to receive a background image from the mobile device 100 or the server 300 and display the background image on the display.

The display apparatus 200 may further include an inputter/outputter configured to receive a video (for example, an image, etc.) an audio (for example, a voice, music, etc.), and additional information (for example, EPG, etc.) from the outside of the display apparatus 200 under control of the controller 240. The inputter/outputter may include one or a combination of a high-definition multimedia interface (HDMI) port, a component jack, a PC port, and a USB port. The display apparatus 200 according to an embodiment may include a TV, which, however, is an embodiment. The display apparatus 200 may be realized as an electronic device including a display. For example, the display apparatus 200 may be realized as various electronic devices, such as a desk top computer, a digital broadcasting terminal, etc.

The display apparatus 200 may be realized not only as a flat display apparatus, but also as a curved display apparatus having a screen having a curvature or a flexible display apparatus, of which a curvature is adjustable.

Also, the display apparatus 200 may be electrically connected to an additional external device (for example, a set top box not shown) having a tuner portion. For example, the display apparatus 200 may be realized as an analog TV, a digital TV, a 3D-TV, a smart TV, an LED TV, an OLED TV, a plasma TV, a monitor, etc. However, it is understood by one of ordinary skill in the art that the display apparatus 200 is not limited thereto.

Meanwhile, the illustrated block diagram of the display apparatus 200 is a block diagram according to an embodiment. The components of the block diagram may be integrated, added, or omitted according to specifications of the actual display apparatus 200. In other words, two or more components may be integrated into one component or one component may be divided into two components, according to necessity. Also, a function performed by each of blocks is explained to describe embodiments, and the specific operations or devices do not limit the scope of claims of the disclosure.

The server 300 may be a computing device configured to execute a server program for providing services in response to a request of a user (a client).

The server 300 may include a communication interface 310 and a controller 320.

The communication interface 310 may connect the server 300 with an external device, for example, the mobile device 100 or the display apparatus 200, under control of the controller 320. The communication interface 220 may include one or a combination of a wireless LAN, Bluetooth, and wired Ethernet in correspondence to the performance and the structure of the display apparatus.

The memory 330 may store various data, programs, or applications for operating and controlling the server 300 under control of the controller 320. The memory 330 may store an operating system for controlling the server 300 and a controller, an application initially provided from a manufacturer or downloaded from the outside, a graphical user interface (GUI) related to the application, an object (for example, an image, text, an icon, a button, etc.) for providing the GUI, user information, documents, databases, or related data.

The memory 330 may include ROM, RAM, or a memory card (for example, a micro SD card or a USB memory not shown) mounted in the server 300. Also, the memory 330 may include a nonvolatile memory, a volatile memory, an HDD, or an SSD.

In particular, according to an embodiment, the memory 330 may include one or more instructions for transmitting an application for controlling one or more assumed devices to the mobile device 100, in response to a request from the mobile device 100. The device control application may be used to control the display apparatus 200, and in particular, the device control application may include one or more instructions for setting a background image of the display apparatus 200.

According to an embodiment, the memory 330 may include one or more instructions for transmitting information about the display apparatus 200 in response to a request of the mobile device 100. The information about the display apparatus 200 may include size information of the display apparatus 200, in detail, screen size information of the display apparatus 200.

According to an embodiment, the memory 330 may include one or more instructions for receiving a marker display event from the mobile device 100 and transmitting the marker display event to the display apparatus 200.

According to an embodiment, the memory 330 may include one or more instructions for receiving a background image from the mobile device 100 and transmitting the background image to the display apparatus 200. The background image may include an image generated by using a peripheral region of a wall surface on which the display apparatus 200 is mounted.

The controller 320 may control general operations of the server 300 and signal flows among the components of the server 300 and may process data. When there is a user input or a pre-set and stored condition is satisfied, the controller 320 may execute an OS and various applications stored in the memory 250.

Processors used as the controller 320 may include a graphic processing unit (not shown) for processing graphics corresponding to a video. The processors may be realized as an SoC, in which a core (not shown) and a GPU (not shown) are integrated. The processors may include a single core, a dual core, a triple core, a quad core, and a multi-core.

Also, the processors may include a plurality of processors. For example, the processors may be realized as a main processor (not shown) and a sub-processor (not shown) operating in a sleep mode.

The controller 320 according to an embodiment may execute the one or more instructions stored in the memory 330 to transmit an application for controlling one or more home appliances to the mobile device 100 in response to a request from the mobile device 100. The device control application may be used to control the display apparatus 200, and in particular, the device control application may include one or more instructions for setting a background image of the display apparatus 200.

The controller 320 according to an embodiment may execute the one or more instructions stored in the memory 330 to transmit the information about the display apparatus 200 in response to a request from the mobile device 100. The information about the display apparatus 200 may include size information of the display apparatus 200, in detail, screen size information of the display apparatus 200.

The controller 320 according to an embodiment may execute the one or more instructions stored in the memory 330 to receive a marker display event from the mobile device 100 and to transmit the marker display event to the display apparatus 200.

The controller 320 according to an embodiment may execute the one or more instructions stored in the memory 330 to receive a background image from the mobile device 100 and to transmit the background image to the display apparatus 200. The background image may include an image generated by using a peripheral region of a wall surface on which the display apparatus 200 is mounted.

The mobile device 100 may capture an image of a wall surface on which the display apparatus 200 is mounted, generate a background image to be displayed on a screen of the display apparatus 200 based on the captured image, and transmit the generated image to the display apparatus 200 via the server 300.

The mobile device 100 may include an imaging sensor circuit 110, a communication interface 120, a display 130, a memory 140, and a controller 150.

The imaging sensor circuit 110 may receive an image (for example, a consecutive frame) corresponding to a motion of a user within a recognition range of an imaging sensor, the motion including a gesture. The imaging sensor circuit 110 may be realized as a camera. The imaging sensor circuit 110 according to an embodiment may capture an image indicating a wall surface to be displayed by the display apparatus 200.

The communication interface 120 may connect the mobile device 100 with an external device, for example, the display apparatus 200 or the server 300, under control of the controller 150. The communication interface 120 may include one or a combination of a wireless LAN, Bluetooth, and wired Ethernet in correspondence to the performance and the structure of a mobile device. The communication interface 120 may include, in detail, a mobile communicator and a sub-communicator.

The mobile communicator may perform broadband networks according to various communication standards, such as Zigbee, 3G, 3GPP, LTE, etc. The mobile communicator may be used for communication with the server 300.

The sub-communicator may perform communication with peripheral devices by using short-range wireless communication protocols, such as Bluetooth, BLE, Wifi, NFC, infrared communication, laser beam communication, etc. The sub-communicator may be used for communication with the display apparatus 200.

The display 130 may display content received from various sources on a screen under control of the controller 150. Various sources may include, for example, a communication interface 120, a memory 140, and an inputter/outputter. Also, the display 130 may include a touch screen, which may be used as an input device as well as an output device.

The memory 140 may store various data, programs, or applications for operating and controlling the mobile device 100 under control of the controller 150. The memory 140 may store an operating system for controlling the mobile device 100 and a controller, an application initially provided from a manufacturer or downloaded from the outside, a GUI related to the application, an object (for example, an image, text, an icon, a button, etc.) for providing the GUI, user information, documents, databases, or related data.

The memory 140 may include ROM, RAM, or a memory card (for example, a micro SD card or a USB memory not shown) mounted in the mobile device 100.

In particular, according to an embodiment, the memory 140 may include one or more instructions for transmitting a request for downloading an application for controlling home appliances to the server 300 and receiving and storing a device control application in response to the request. The device control application may include one or more instructions for controlling the display apparatus 200, and in particular, the one or more instructions used to set a background image of the display apparatus 200.

According to an embodiment, the memory 140 may include one or more instructions for transmitting information about the display apparatus 200 to the mobile device 100 or the server 300. The information about the display apparatus 200 may include size information of the display apparatus 200, in detail, screen size information of the display apparatus 200.

According to an embodiment, the memory 140 may include one or more instructions for generating a marker display event by using the information about the display apparatus 200 and transmitting the marker display event to the mobile device 100 or the server 300. The marker display event may include information about a location of one or more markers to be displayed on a screen of the display apparatus according to a screen size of the display apparatus 200.

According to an embodiment, the memory 140 may include one or more instructions for obtaining an image of a region of a wall surface on which the display apparatus 200 is mounted by using the one or more markers displayed on the screen of the display apparatus 200 in response to the marker display event, processing the obtained image to generate a background image to be displayed on the screen of the display apparatus 200, and transmitting the background image to the display apparatus 200 or the server 300.

According to an embodiment, the memory 140 may include one or more instructions for generating an event instructing a plurality of markers to be displayed on the screen of the display apparatus and transmitting the event to the display apparatus, determining, from among images obtained by a camera, an image from which at least a region of a wall surface in the vicinity of the display apparatus is to be extracted, based on recognizing the plurality of markers displayed on the screen of the display apparatus in response to the generated event, extracting, from the determined image, a region corresponding to a shape obtained based on the recognized plurality of markers, generating a background image to be displayed on the screen of the display apparatus by correcting an image of the extracted region, and transmitting the generated background image to the display apparatus for the display apparatus to display the generated background image on the screen. The correction of the image of the extracted region may be performed by adjusting a length of one or more sides of the image of the extracted region, rotating the image of the extracted region, obtaining a symmetric region of the extracted region, etc.

The controller 150 may control general operations of the mobile device 100 and signal flows among the components of the mobile device 100 and may process data. When there is a user input or a pre-set and stored condition is satisfied, the controller 150 may execute an OS and various applications stored in the memory 140.

Processors used as the controller 150 may include a graphic processing unit (not shown) for processing graphics corresponding to a video. The processors may be realized as an SoC, in which a core (not shown) and a GPU (not shown) are integrated. The processors may include a single core, a dual core, a triple core, a quad core, and a multi-core.

Also, the processors may include a plurality of processors. For example, the processors may be realized as a main processor (not shown) and a sub-processor (not shown) operating in a sleep mode.

The controller 150 according to an embodiment may execute the one or more instructions stored in the memory 140 to transmit a request for downloading an application for controlling home appliances to the server 300 and receive and store a device control application according to the request. The device control application may include one or more instructions for controlling the display apparatus 200, and in particular, the one or more instructions used to set a background image of the display apparatus 200.

The controller 150 according to an embodiment may execute the one or more instructions stored in the memory 140 to transmit the information about the display apparatus 200 to the mobile device 100 or the server 300. The information about the display apparatus 200 may include size information of the display apparatus 200, in detail, screen size information of the display apparatus 200.

The controller 150 according to an embodiment may execute the one or more instructions stored in the memory 140 to generate a marker display event by using the information about the display apparatus 200 and to transmit the marker display event to the mobile device 100 or the server 300. The marker display event may include information about a location of one or more markers to be displayed on a screen of the display apparatus according to a screen size of the display apparatus 200.

The controller 150 according to an embodiment may execute the one or more instructions stored in the memory 140 to obtain an image of a region of the wall surface on which the display apparatus 200 is mounted by using the one or more markers displayed on the screen of the display apparatus 200 in response to the marker display event, to generate the background image to be displayed on the screen of the display apparatus 200 by processing the obtained image, and to transmit the background image to the display apparatus 200 or the server 300.

The controller 150 according to an embodiment may execute the one or more instructions stored in the memory 140 to extract, from an obtained image, a region of a shape corresponding to a polygon obtained by connecting the one or more markers displayed on the screen of the display apparatus 200, to correct an image of the obtained region, and to generate the background image to be displayed on the screen of the display apparatus by using the corrected image. The correction of the image of the extracted region may be performed by adjusting a length of one or more sides of the image of the extracted region, rotating the image of the extracted region, obtaining a symmetric region of the extracted region, etc.

Meanwhile, the illustrated block diagram of the mobile device 100 is a block diagram according to an embodiment. The components of the block diagram may be integrated, added, or omitted according to specifications of the actual mobile device 100. That is, two or more components may be integrated into one component or one component may be divided into two components, according to necessity. Also, a function performed by each of blocks is explained to describe embodiments, and the specific operations or devices do not limit the scope of claims of the disclosure.

The mobile device 100 according to an embodiment may be realized as various electronic devices, such as a cellular phone, a tablet PC, a digital camera, a camcorder, a laptop computer, a tablet PC, an electronic book terminal, a digital broadcasting terminal, a personal digital assistant (PDA), a portable multimedia player (PMP), a navigation device, an MP3 player, a wearable device, etc.

Figure 5:
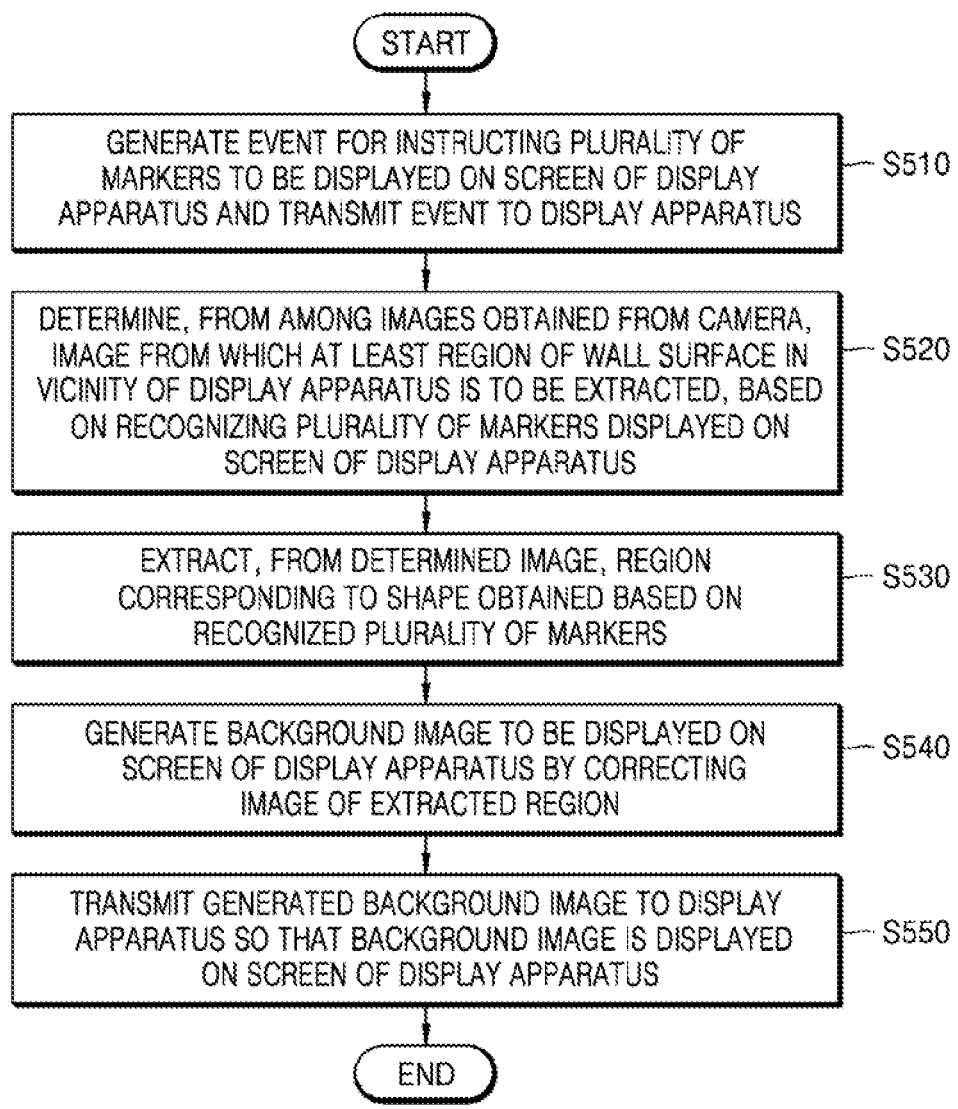
FIG. 5 shows an operating method of a mobile device, according to an embodiment.

FIG. 5 shows an operating method of a mobile device, according to an embodiment.

Referring to FIG. 5, in operation S510, the mobile device 100 may generate an event instructing one or more markers to be displayed on a screen of the display apparatus 200 and may transmit the generated event to the display device 200.

According to an embodiment, the mobile device 100 may determine a location of the one or more markers to be displayed on the screen of the display apparatus 200 with reference to screen size information of the display apparatus 200.

According to an embodiment, the mobile device 100 may receive the screen size information of the display apparatus 200 from a user, from the display apparatus 200, or from the server 300.

According to an embodiment, the mobile device 100 may generate a marker display event including the determined location of the one or more markers and transmit the generated marker display event to the display apparatus 200.

According to an embodiment, the mobile device 100 may directly transmit the marker display event to the display apparatus 200 or may transmit the marker display event to the display apparatus 200 via the server 300.

In operation S520, the mobile device 100 may determine, from among images obtained by using a camera, an image from which at least a region of a wall surface in the vicinity of the display apparatus 200 is to be extracted, based on recognizing the one or more markers displayed on the screen of the display apparatus in response to the generated marker display event.

According to an embodiment, the mobile device 100 may determine, from among the images obtained from the camera, an image from which at least a region of a wall surface in the vicinity of the display apparatus 200 is to be extracted, by using the one or more markers displayed on the screen of the display apparatus and one or more guides displayed on a display of the mobile device.

In operation S530, the mobile device 100 may extract, from the determined image, a region corresponding to a shape obtained based on the one or more markers displayed on the screen of the display apparatus 200.

In operation S540, the mobile device 100 may correct an image of the extracted region and generate a background image to be displayed on the screen of the display apparatus.

According to an embodiment, the mobile device 100 may correct the image of the extracted region and use the corrected image and a symmetric image of the corrected image to generate the background image.

The correction of the image of the extracted region may be performed by at least one of adjusting a length of one or more sides (edges) of the image of the extracted region, rotating the image of the extracted region, obtaining a symmetric region of the extracted region, etc.

In operation S550, the mobile device 100 may transmit the generated background image to the display apparatus, so that the generated background image is displayed on the screen of the display apparatus.

According to an embodiment, the mobile device 100 may directly transmit the generated background image to the display apparatus 200 or may transmit the generated background image to the display apparatus 200 via the server 300.

Figure 6:
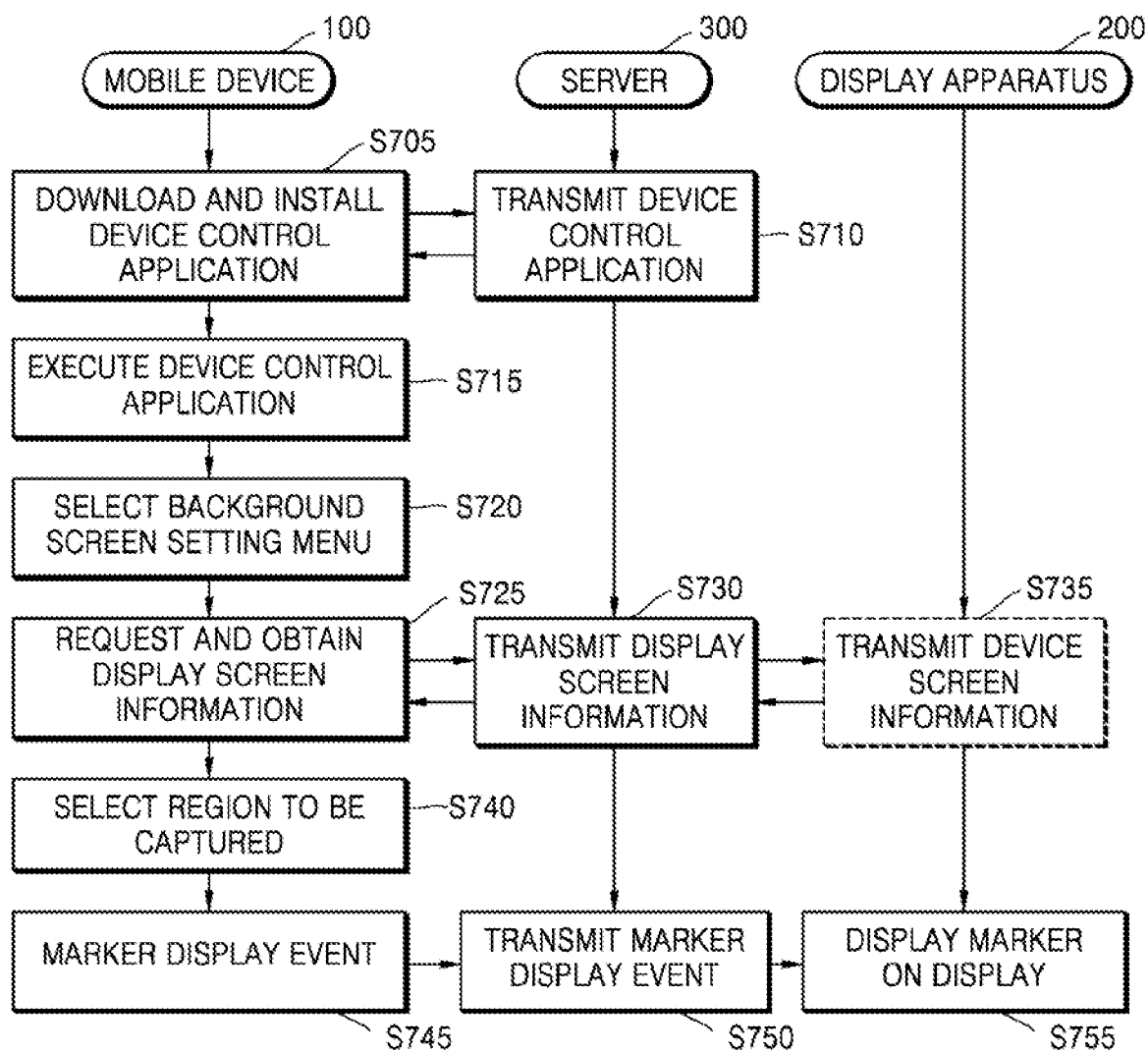
FIG. 6 is a flowchart of operations of a mobile device, a server, and a display apparatus for displaying a background image on the display apparatus by using an image of a wall surface on which the display apparatus is mounted, according to an embodiment.
Figure 7:
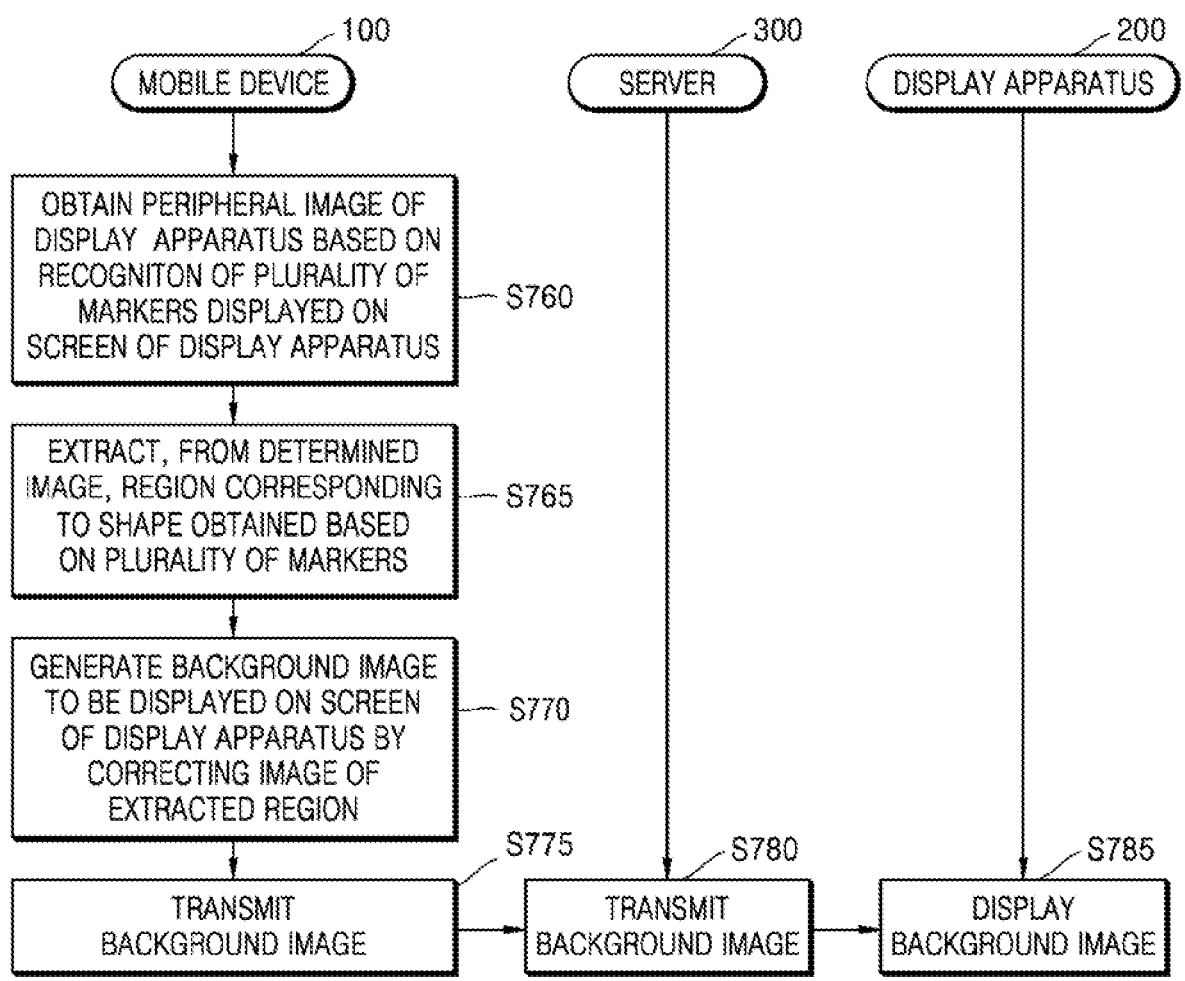
FIG. 7 is a flowchart of operations of a mobile device, a server, and a display apparatus for displaying a background image on the display apparatus by using an image of a wall surface on which the display apparatus is mounted, according to an embodiment.

FIGS. 6 and 7 are flowcharts of operations of a mobile device, a server, and a display apparatus for displaying a background image on the display apparatus by using an image of a wall surface on which the display apparatus is mounted, according to an embodiment.

Referring to FIG. 6, in operation S705, the mobile device 100 may download and install a device control application, and in operation S710, the server 300 may transmit the device control application to the mobile device 100.

When the mobile device 100 requests a download of the device control application from the server 300, the server may transmit the device control application to the mobile device 100 and the mobile device 100 may receive and install the device control application. The device control application may include applications for controlling various home appliance devices, such as a refrigerator, a display apparatus, a laundry machine, an audio device, etc.

In operation S715, the mobile device 100 may execute the installed device control application.

In operation S720, the mobile device 100 may receive a user input for selecting a background screen setting menu.

Figure 8:
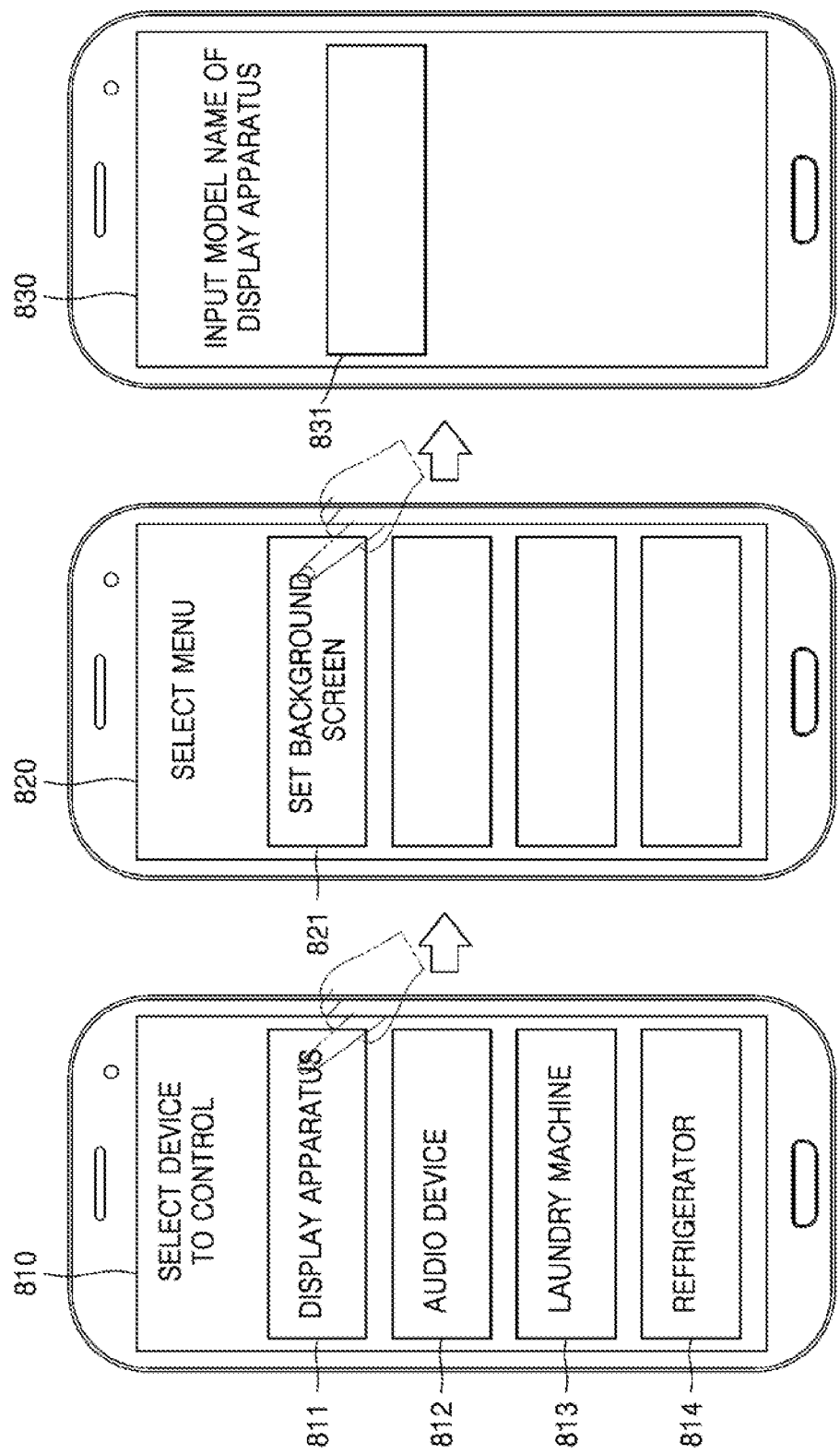
FIG. 8 shows a user interface provided by a mobile device 100 by executing a device control application, according to an embodiment.

FIG. 8 shows a user interface provided by the mobile device 100 by executing a device control application, according to an embodiment.

Referring to FIG. 8, a first user interface 810 of the device control application executed by the mobile device 100 may receive a user input for selecting a device to control. The first user interface 810 may display, as a device to control, a display apparatus 811, an audio device 812, a laundry machine 813, and a refrigerator 814, and a user may select one of the displayed devices.

When the display apparatus 811 is selected by the user, the mobile device 100 may output a second user interface 820. The second user interface 820 may display menu items related to controlling of the display apparatus, and one of the menu items may be a background screen setting item 821. The background screen setting item 821 may be a menu item, through which it may be set for the display apparatus to display the same image as an image of a wall surface on which the display apparatus is mounted, while the display apparatus does not operate based on user manipulation.

When the background screen setting item 821 is selected by the user, the mobile device 100 may output a third user interface 830. The third user interface 830 may include an input window 831 through which a model name of the display apparatus may be input. The mobile device 100 may receive the model name of the display apparatus through the input window 831.

Back in operation S725, the mobile device 100 may request and obtain screen information of the display apparatus. The screen information of the display apparatus may include a size of the screen of the display apparatus 200. The screen information of the display apparatus may be used to determine a location of one or more markers to be displayed on the screen of the display apparatus. The screen information of the display apparatus may be included in product information of the display apparatus and may be obtained by using the model name of the display apparatus.

The mobile device 100 may obtain the screen information of the display apparatus by using the model name of the display apparatus received through the third user interface 830.

In operation S730, according to an embodiment, the mobile device 100 may transmit the model name of the display apparatus to the server 300 and may receive the screen information of the display apparatus, the screen information corresponding to the model name of the display apparatus, from the server 300.

In operation S735, according to another embodiment, the server 300 may transmit the model name of the display apparatus received from the mobile device 100 to the display apparatus 200, and the display apparatus 200 may transmit the screen information of the display apparatus, the screen information corresponding to the model name of the display apparatus, to the mobile device 100 via the server 300.

According to another embodiment, the mobile device 100 may store the screen information of the display apparatus, the screen information corresponding to the model name of the display apparatus, and thus, may obtain the screen information of the display apparatus without a request from the server 300.

In operation S740, the mobile device 100 may select a region of an image of a wall surface on which the display apparatus 200 is mounted. The mobile device 100 may be converted into a photo capturing mode after obtaining the screen information of the display apparatus.

When a user locates the mobile device 100 to obtain the image of the wall surface on which the display apparatus 200 is mounted, a camera of the mobile device 100 may sense the image of the wall surface including the display apparatus 200 and on which the display apparatus 200 is mounted and a display of the mobile device 100 may display the image of the wall surface including the display apparatus 200 as a preview image. Also, the mobile device 100 may display a guideline of a region to be captured, on the preview image. Also, the mobile device 100 may display guidelines of a plurality of regions to be captured and may receive an input of selecting one region from the user. Methods of selecting a region to be captured via the mobile device 100 will be described with reference to FIGS. 9 through 11.

Figure 9:
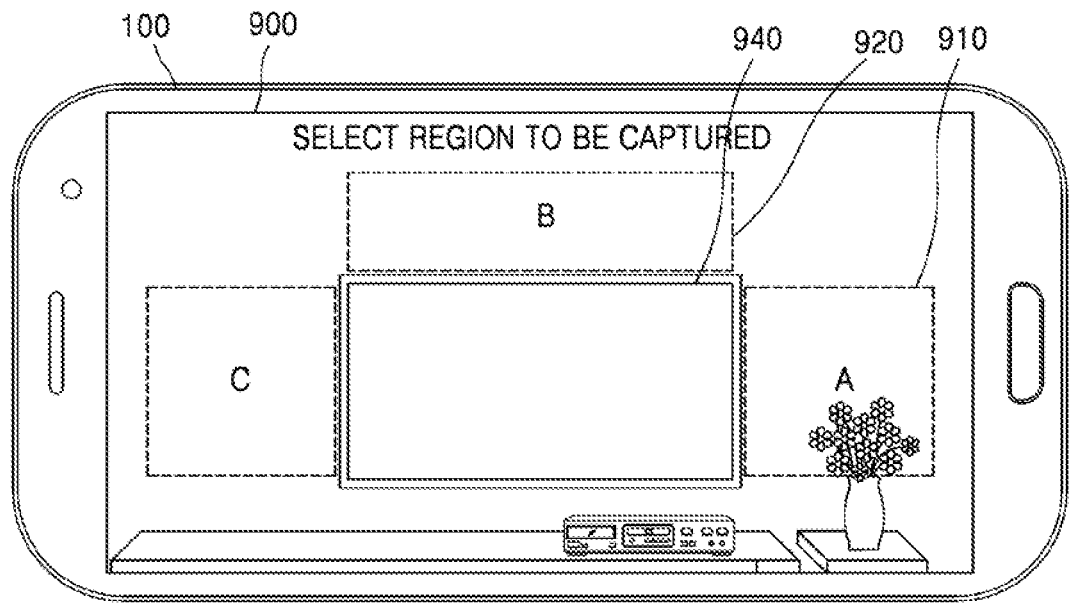
FIG. 9 shows an example of a preview image displayed on a display of a mobile device 100, according to an embodiment.

FIG. 9 shows an example of a preview image displayed on a display of the mobile device 100, according to an embodiment.

Referring to FIG. 9, the mobile device 100 may obtain an image of a wall surface on which the display apparatus 200 is mounted by using a camera and display the obtained image on the display as a preview image 900. Also, the display 100 may display a guideline for selecting a region to be captured, on the displayed preview image 900. In FIG. 9, a guideline 910 indicating a right region A of the display apparatus 200, a guideline 920 indicating an upper region B of the display apparatus 200, and a guideline 930 indicating a left region C of the display apparatus 200 are displayed on the preview image 900. A user may select one of the guidelines 910, 920, and 930 to select an image region of the wall surface, the image region being to be captured.

The mobile device 100 may variously determine a region to be captured of the wall surface.

According to an embodiment, the mobile device 100 may determine a region to be captured of the wall surface, as default.

According to an embodiment, the mobile device 100 may display regions of the wall surface that are to be captured, as illustrated in FIG. 9, so that a user may select a region. The mobile device 100 may determine a location of a marker to be displayed on a display apparatus according to the selection of the region to be captured of the wall surface, and may determine an event including information about the location of the marker to the display apparatus.

FIG. 10 shows a region to be captured of a wall surface in the vicinity of a display apparatus, according to an embodiment.

1000A of FIG. 10 illustrates an example in which, in the case of a stand-type display apparatus 200, wall surface images of a right region, an upper region, and a left region of a wall surface in the vicinity of the display apparatus 200 are captured, according to an embodiment. When a screen size of the display apparatus 200 is (width X, height Y), a size of the left region or the right region to be captured may be determined as (width X/2, height Y), and a size of the upper region to be captured may be determined as (width X, height Y/2). Each of regions A, B, and C corresponds to a half of the screen size of the display apparatus 200. Thus, a background image to be displayed on a screen of the display apparatus 200 may be generated by doubling the size of the region that is captured.

1000B of FIG. 10 illustrates an example in which, in the case of a wall-hanging-type display apparatus 200, wall surface images of a left region, a right region, an upper region, and a lower region of a wall surface in the vicinity of the display apparatus 200 are captured, according to an embodiment.

FIG. 11 is a reference view for describing a size of a region to be captured of a wall surface in the vicinity of a display apparatus, according to an embodiment.

1100A of FIG. 11 illustrates an example in which wall surface images of a left region, a right region, an upper region, and a lower region of a wall surface in the vicinity of the display apparatus 200 are captured, according to an embodiment. When a screen size of the display apparatus 200 is (width X, height Y), a size of the left region or the right region to be captured may be determined as (width X/3, height Y), and a size of the upper region or the lower region to be captured may be determined as (width X, height Y/3). Each of regions A, B, C and D corresponds to one third of the screen size of the display apparatus 200. Thus, a background image to be displayed on a screen of the display apparatus 200 may be generated by tripling the size of the region that is captured.

1100B of FIG. 11 illustrates an example in which wall surface images of a left region, a right region, an upper region, and a lower region of a wall surface in the vicinity of the display apparatus 200 are captured, according to an embodiment. When a screen size of the display apparatus 200 is (width X, height Y), a size of the left region or the right region to be captured may be determined as (width X/4, height Y), and a size of the upper region or the lower region to be captured may be determined as (width X, height Y/4). Each of regions A, B, C and D corresponds to one fourth of the screen size of the display apparatus 200. Thus, a background image to be displayed on a screen of the display apparatus 200 may be generated by quadrupling the size of the region that is captured.

In operation S745, the mobile device 100 may generate a marker display event according to selection of a region to be captured and transmit the generated marker display event to the server 300. In operation S750, the server 300 may transmit the marker display event received from the mobile device 100 to the display apparatus 200. In operation S755, the display apparatus 200 may display one or more markers on a display screen according to the marker display event received from the server 300.

Detailed operations of operations S745, S750, and S755 are described with reference to FIGS. 12 and 13.

Figure 12:
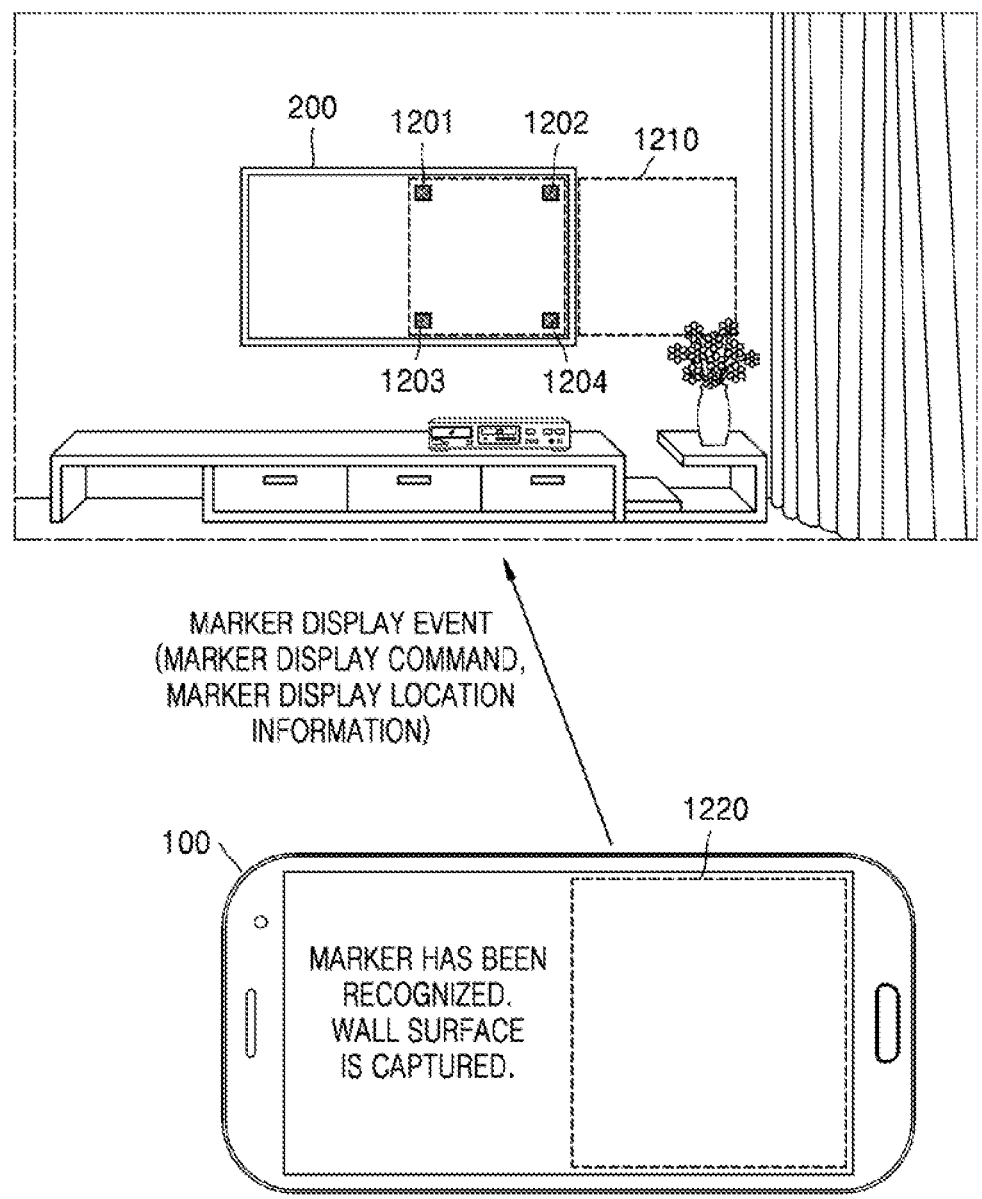
FIG. 12 is a reference view for describing a method, performed by a mobile device, of transmitting a marker display event to a display apparatus, according to an embodiment.

FIG. 12 is a reference view for describing a method, performed by a mobile device, of transmitting a marker display event to a display apparatus, according to an embodiment.

Referring to FIG. 12, the mobile device 100 may generate a marker display event 1200, by using display screen information obtained in operation S725 and a selected region to be captured in operation S740. The marker display event refers to an event for instructing the display apparatus 200 to display one or more markers on the display screen. The marker display event may include a command for the display apparatus 200 to display one or more markers on the display screen and information about a location of the one or more markers to be displayed on the display screen. The mobile device 100 may directly transmit the generated marker display event 1200 to the display apparatus 200 or transmit the generated marker display event 1200 to the display apparatus 200 via the server 300. The display apparatus 200 having received the marker display event 1200 may display one or more markers 1201, 1202, 1203, and 1204 on the display screen according to the information about the location of the one or more markers included in the marker display event. The information about the location of the one or more markers may be changed according to the selected region to be captured in operation S740. As illustrated in FIG. 12A, when an image of a right wall surface of the display apparatus 200 is to be captured, the one or more markers may be displayed on the right half side of the display screen of the display apparatus 200.

In an example illustrated in FIG. 12, the markers are displayed in square shapes. However, the markers may be displayed in various shapes, such as circular or triangular shapes.

Figure 13:
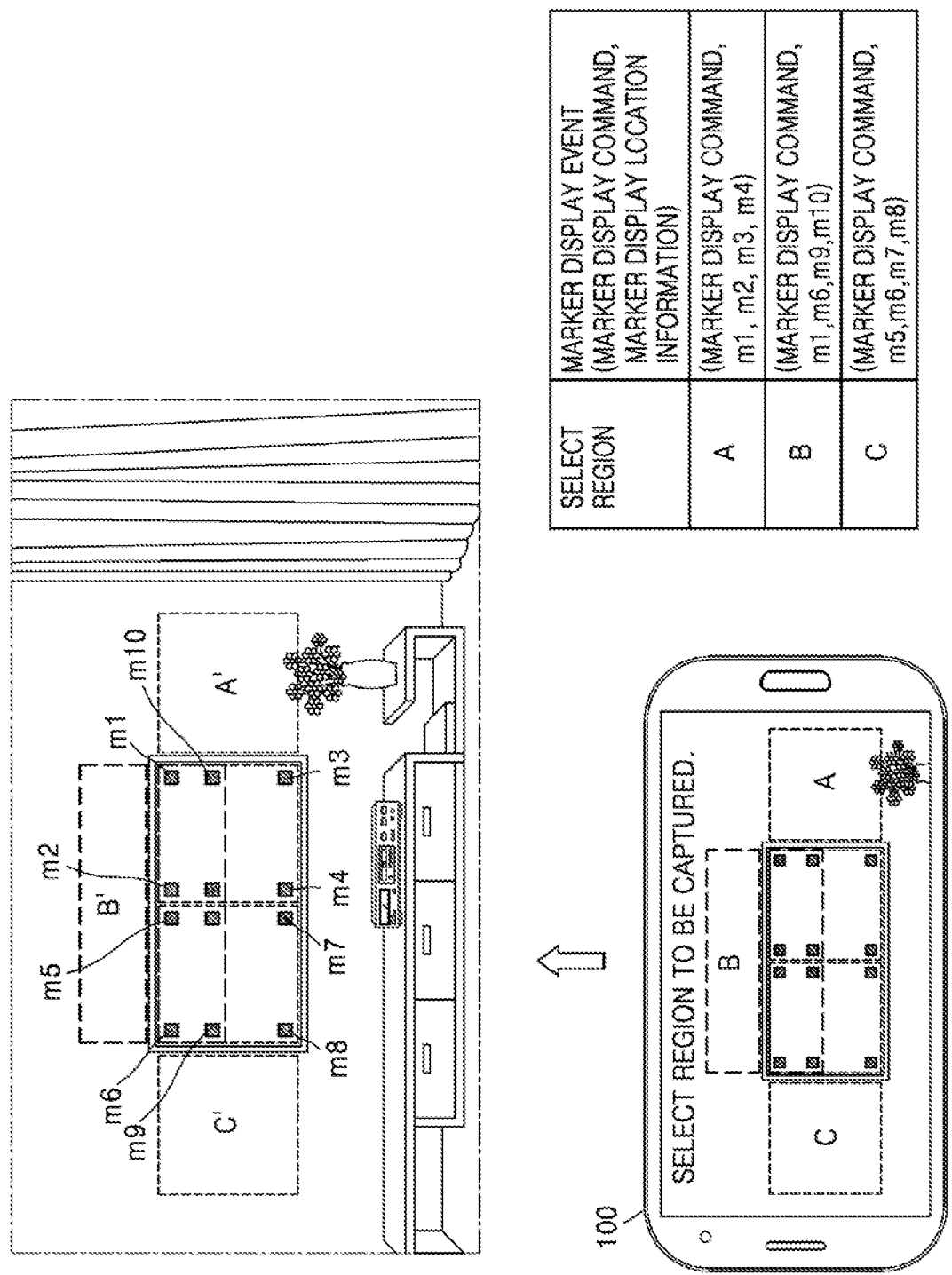
FIG. 13 is a view for describing a method of determining a location to display a marker according to a region selected to be captured, according to an embodiment.

FIG. 13 is a view for describing a method of determining a location to display a marker according to a selected region to be captured, according to an embodiment.

Referring to FIG. 13, when the mobile device 100 selects a region A as a region to be captured, a corresponding region of a wall surface may be a region A'. The mobile device 100 may determine a location of one or more markers as the right half side of the screen of the display apparatus 200 in order to capture an image of the region A'. That is, when the region A is selected, the mobile device 100 may determine the location to display the markers as m1, m2, m3, and m4. Also, when the region B is selected, the mobile device 100 may determine the location to display the markers as m1, m6, m9, and m10 so as to display the one or more markers on the upper half side of the screen of the display apparatus. Also, when the region C is selected, the mobile device 100 may determine the location to display the markers as m5, m6, m7, and m8 so as to display the one or more markers on the left half side of the screen of the display apparatus.

In the example illustrated in FIG. 13, the region to be captured is determined as a half of the screen of the display apparatus, and thus, the plurality of markers are displayed at the location corresponding to the half of the screen of the display apparatus. However, when the region to be captured corresponds to one third or one fourth of the screen of the display apparatus, the location of the markers may be correspondingly changed.

In operation S760 of FIG. 7 again, the mobile device 100 may obtain a peripheral image of the display apparatus by recognizing the plurality of markers displayed on the display apparatus 200. In detail, the mobile device 100 may determine, from among images obtained by using a camera, an image from which at least a region of a wall surface in the vicinity of the display apparatus is to be extracted, based on recognizing the one or more markers displayed on the screen of the display apparatus in response to the marker display event.

According to an embodiment, when the markers are displayed on the display apparatus 200 as illustrated in FIG. 12, a user may view the markers and move the mobile device 100 such that the markers are located on the left half side of a screen of the mobile device 100, so that a right region 1210 of the display apparatus 200 is located on the right half side of a preview image of the mobile device 100. In this case, the mobile device 100 may capture an image in response to a user command to capture an image.

According to another embodiment, when a user views the markers of the display apparatus 200 and moves the mobile device 100 such that the markers are located on the left half side of the screen of the mobile device 100, an imaging sensor of the mobile device 100 may recognize the markers displayed on the display apparatus 200, and when the recognition of the markers is completed, the mobile device 100 may automatically capture a wall surface image. The mobile device 100 may recognize the markers by comparing a pre-stored feature point of a marker image with a feature point extracted from the markers displayed on the display apparatus 200 by using a marker recognition image processing technique based on feature point matching.

According to another embodiment, in order to accurately capture an image, the mobile device 100 may display one or more guides on a preview image displayed on a display screen of the mobile device 100. When a user moves the mobile device 100 such that the guides on the preview image are located at the one or more markers displayed on the display screen of the display apparatus 200, the imaging sensor of the mobile device 100 may capture the wall surface image when recognizing the one or more markers. This aspect will be described with reference to FIGS. 14 through 16.

Figure 14:
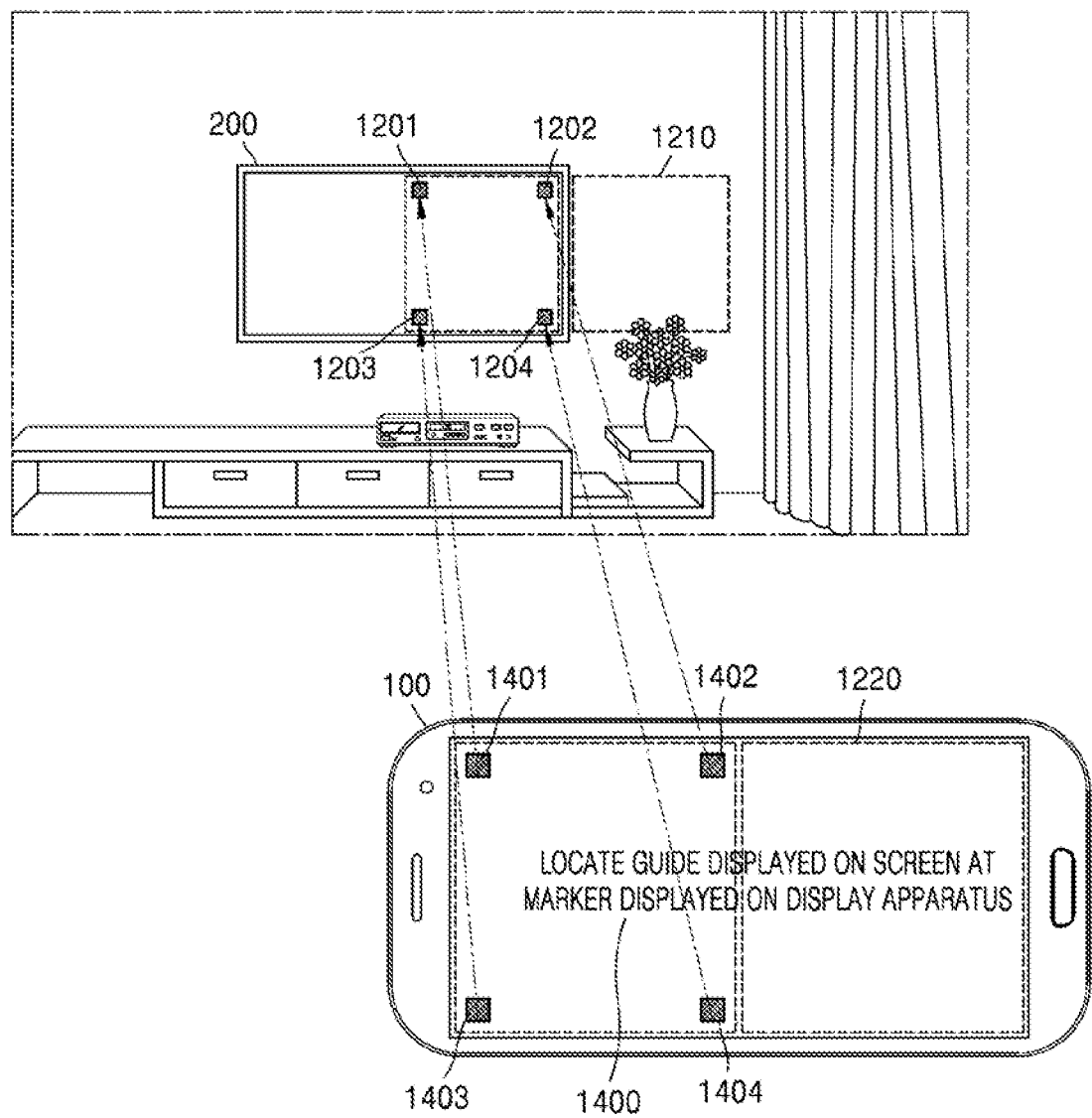
FIG. 14 is a reference view for describing an example of displaying one or more guides in a mobile device, according to an embodiment.

FIG. 14 is a reference view for describing an example of displaying one or more guides in a mobile device, according to an embodiment.

Referring to FIG. 14, the mobile device 100 may display one or more guides 1401, 1402, 1403, and 1404 on a preview image to help recognize markers 1201, 1202, 1203, and 1204 displayed on a screen of the display apparatus 200. A marker may be displayed on the right half screen of the display apparatus 200 and a guide may be displayed on the left half of a preview image of the mobile device 100 so that the mobile device 100 may capture an image 1210 of a right wall surface of the display apparatus 200. When a user respectively locates the guides 1401, 1402, 1403, and 1404 on the preview image at the markers 1201, 1202, 1203, and 1204 displayed on the screen of the display apparatus 200, the image 120 of the right wall surface of the display apparatus 200 may be recognized at a right half region 1220 of the preview image displayed on the screen of the mobile device 100. Thus, when the imaging sensor of the mobile device 100 captures an image by recognizing the markers 1201, 1202, 1203, and 1204 in this state, the image 1210 of the right wall surface may be obtained Also, to provide a user with a help, the mobile device may display a message 1400 of <please locate a guide displayed on the screen at a marker displayed on the display apparatus> on the preview image.

Also, in the example illustrated in FIG. 14, the number of markers displayed on the screen of the mobile device 100 is four. However, it is only an example, and the number of markers may be at least one.

Figure 15:
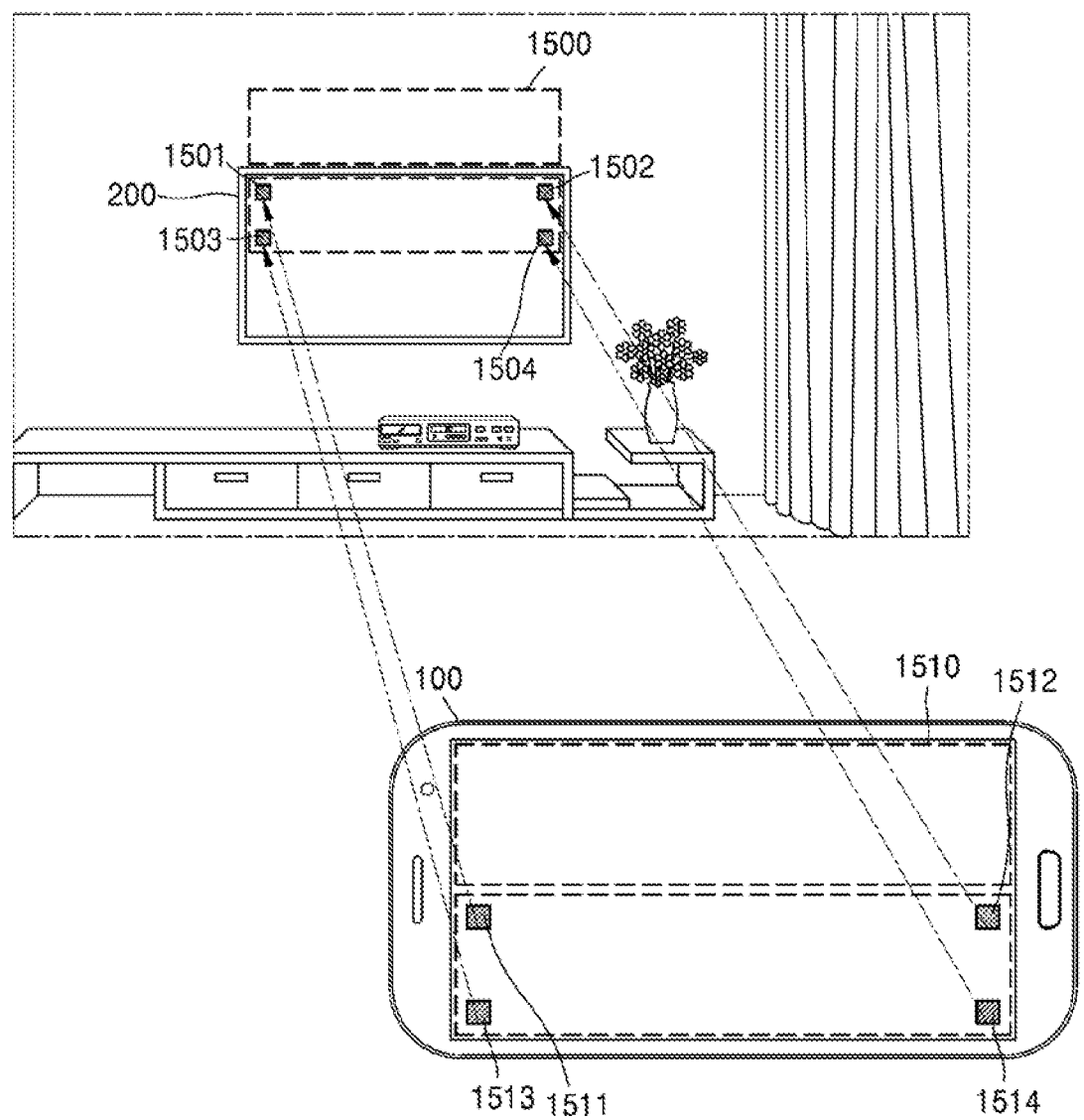
FIG. 15 is a reference view for describing an example of displaying one or more guides in a mobile device, according to an embodiment.

FIG. 15 is a reference view for describing an example of displaying one or more guides in a mobile device, according to an embodiment.

Referring to FIG. 15, the mobile device 100 may display one or more guides 1511, 1512, 1513, and 1514 on a preview image to help recognize markers 1501, 1502, 1503, and 1504 displayed on a screen of the display apparatus 200. The markers may be displayed on the upper half screen of the display apparatus 200 and the guides 1511 through 1514 may be displayed on the lower half side of the preview image of the mobile device 100 so that the mobile device 100 may capture an image 1510 of an upper wall surface of the display apparatus 200. When a user respectively locates the guides 1511, 1512, 1513, and 1514 on the preview image at the markers 1501, 1502, 1503, and 1504 displayed on the screen of the display apparatus 200, the image 1500 of the upper wall surface of the display apparatus 200 may be recognized at a right half region 1510 of the preview image displayed on the screen of the mobile device 100. Thus, when the imaging sensor of the mobile device 100 captures an image in this state, the image 1500 of the upper wall surface may be obtained.

Back in operation S765, the mobile device 100 may extract a region corresponding to a shape obtained based on the plurality of markers, from a determined image. The shape obtained based on the recognized plurality of markers may include a polygonal shape obtained by connecting the plurality of markers.

In operation S770, the mobile device 100 may generate a background image to be displayed on the screen of the display apparatus, by correcting an image of the extracted region.

In operation S775, the mobile device 100 may transmit the generated background image to the server 300 or the display apparatus 200.

In operation S780, the server 300 may receive the background image from the mobile device 100 and transmit the background image to the display apparatus 200.

In operation S785, when the display apparatus 200 receives the background image from the server 300, the display apparatus 200 may display the background image on the screen, in a state other than a normal operation state of the display apparatus 200.

Figure 16:
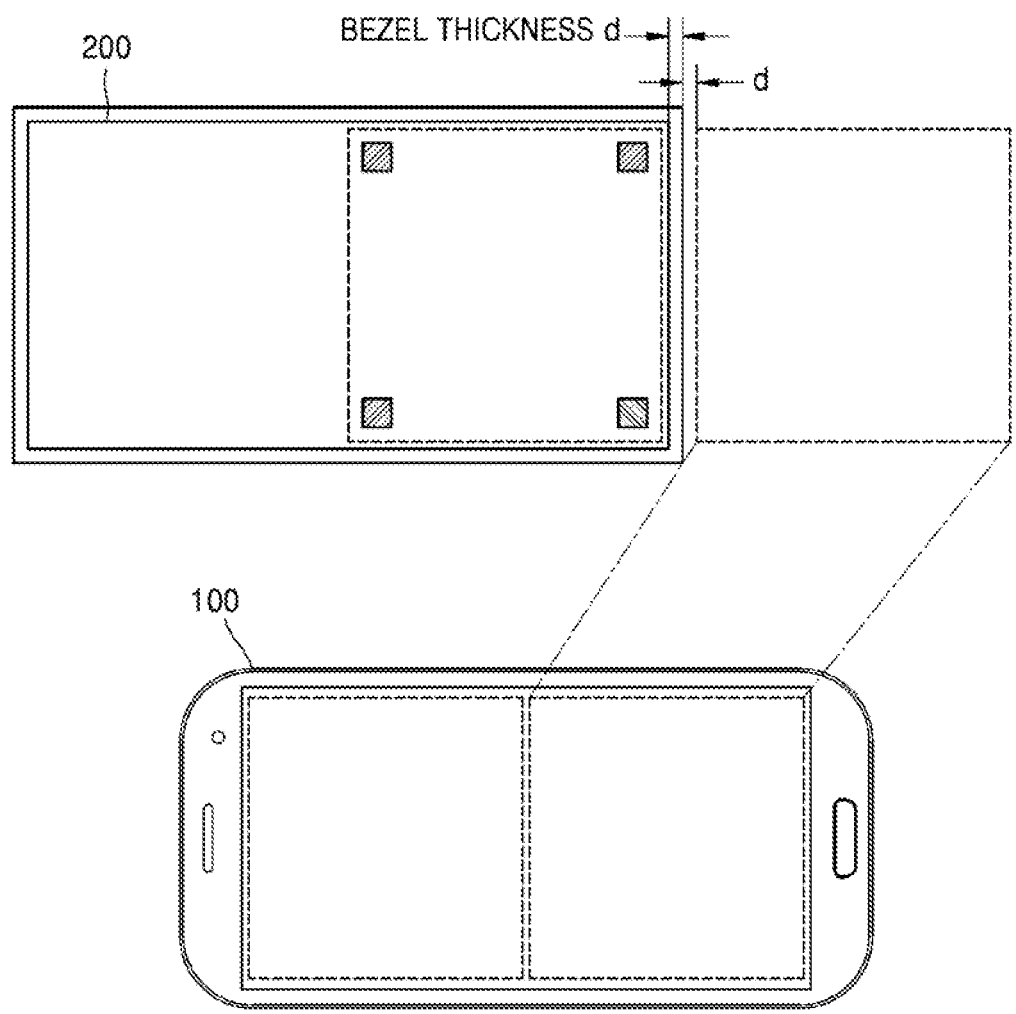
FIG. 16 is a reference view for describing an example of capturing a region which is apart from a display apparatus by a thickness of a bezel, according to an embodiment.

Detailed operations of operations S765 and S770 are described with reference to FIGS. 16 and 23.

According to an embodiment, a wall surface image used by the mobile device 100 to generate a natural background image to be harmonized with the wall surface may not be a wall surface image directly adjacent to the display apparatus 200. Rather, as illustrated in FIG. 16, the mobile device 100 obtain a wall surface image from a region apart from an end of a bezel of the display apparatus 200 by a distance d corresponding to a thickness d of the bezel of the display apparatus 200.

Moreover, a user may capture a peripheral region of a wall surface on which the display apparatus is mounted by locating the mobile device obliquely, rather than capturing the peripheral region of the wall surface in front of the wall surface. When the background image to be displayed on the display apparatus is generated by using the image captured as described above, the generated background image may not be harmonized with the wall surface. Thus, a method of correcting an image by taking this aspect into account is required.

Figure 17:
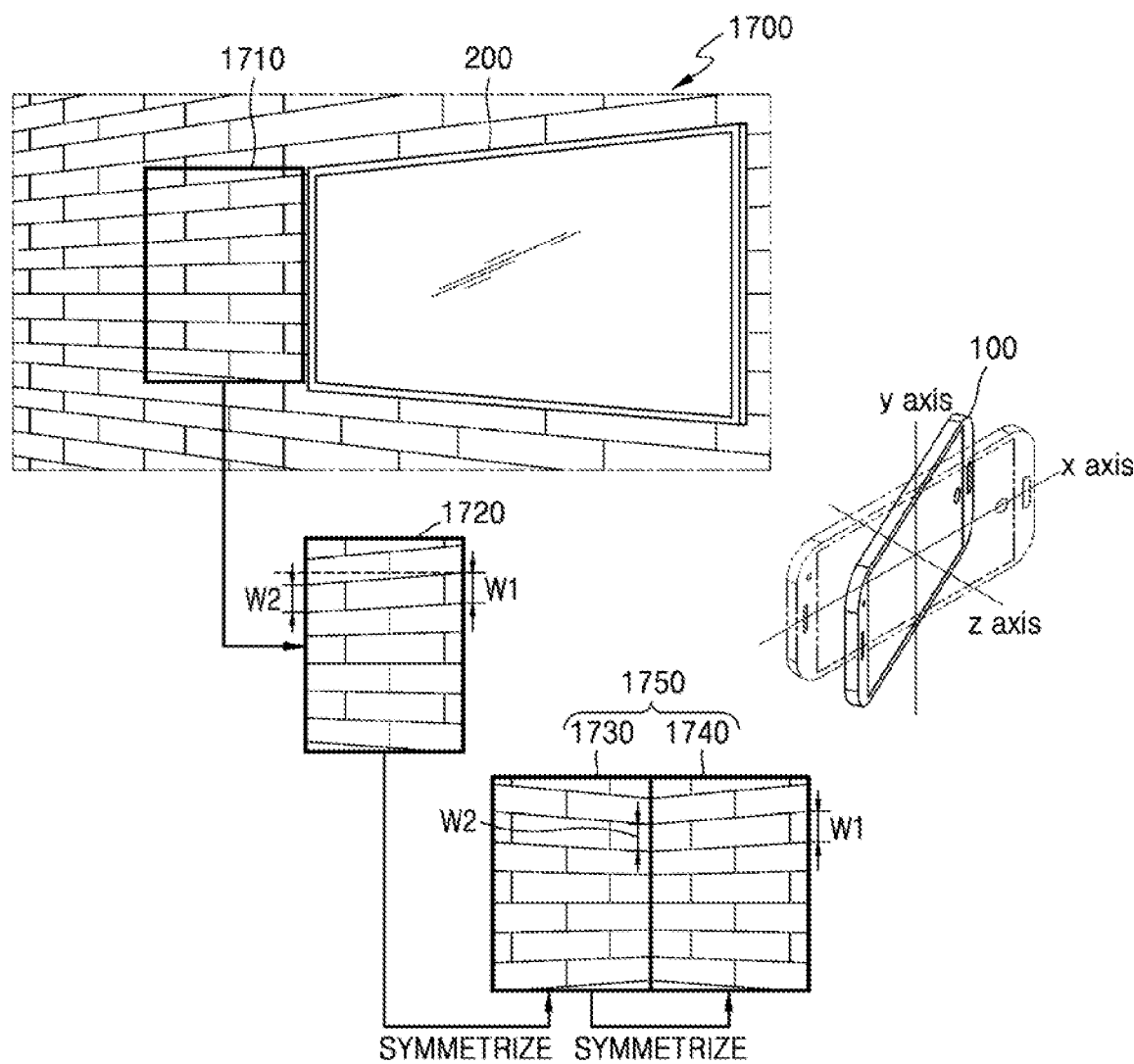
FIG. 17 is a reference view for describing an example in which it is required to correct an image of an extracted region.

FIG. 17 is a reference view for describing an example in which it is required to correct an image of an extracted region.

Referring to FIG. 17, when a user captures a wall surface in front of a wall on which the display apparatus 200 is mounted by using the mobile device 100, the user may locate the mobile device 100 obliquely with respect to an x axis to capture the wall surface, rather than locating the mobile device 100 right in front of the wall surface. In this case, an image 1700 may be displayed on the screen of the mobile device 100. Thus, an image 1720 captured in this state from a region 1710 of a left side wall surface of the display apparatus 200 may be distorted. That is, with respect to the image 1720, a thickness w1 of a brick arranged on the right side of the image 1720 may be different from a thickness w2 of a brick arranged on the left side of the image 1720. A first image 1730 obtained by symmetrizing the image 1720 based on a right side may be arranged at the left side of a background image area and a second image 1740 obtained by symmetrizing the first image 1730 based on a right side may be arranged at the right side of the background image area, to obtain the background image. However, because the image 1720 originally captured is distorted, with respect to a finally generated background image 1750, while a thickness of a brick at a right edge or a left edge is w1, a thickness of a brick at a central region is w2. Thus, it is shown that the generated image is distorted.

Thus, hereinafter, with reference to FIGS. 18 through 23, a method of generating a background image by correcting a distorted image in various situations is described.

Figure 18:
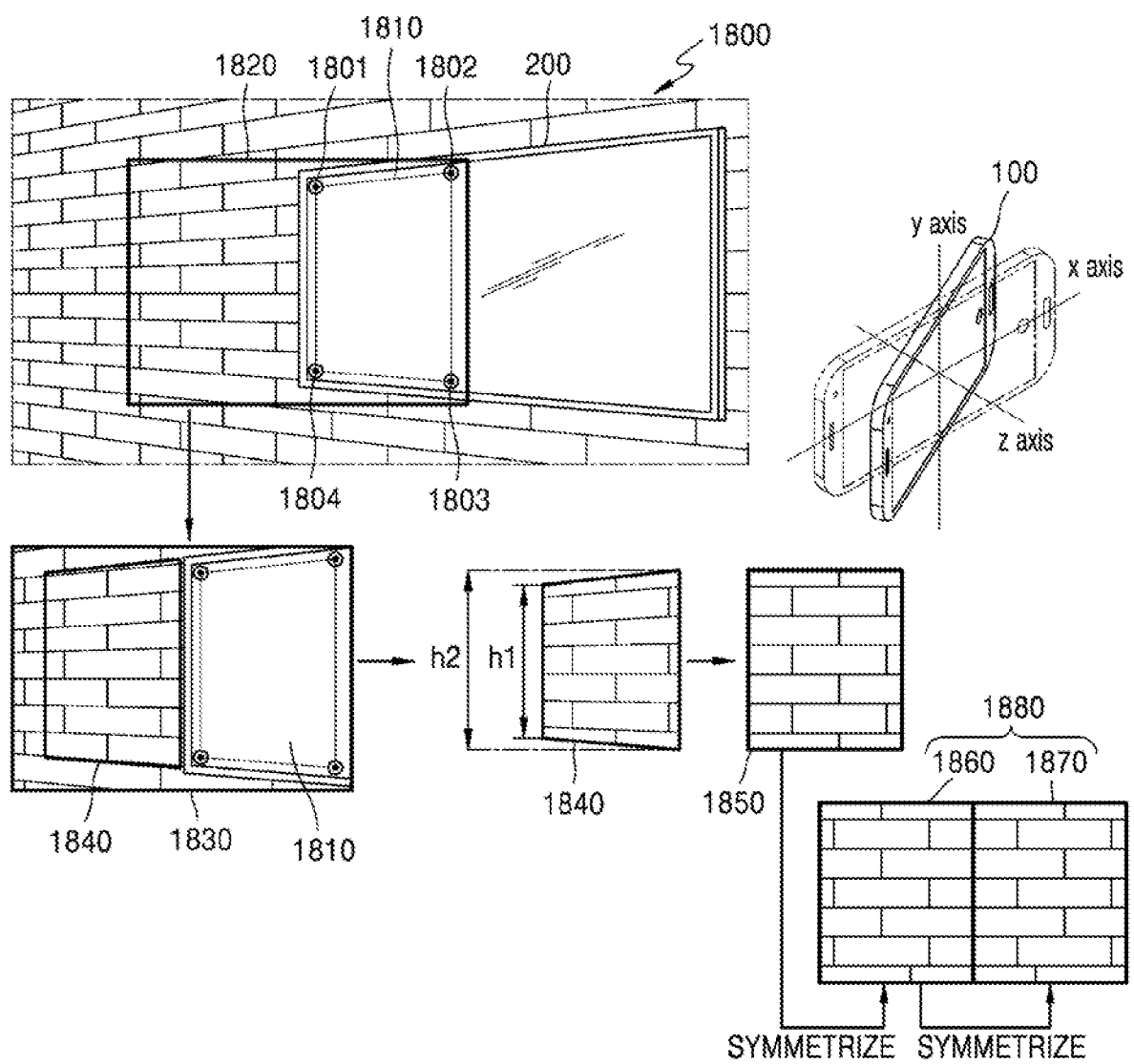
FIG. 18 is a reference view for describing correction of a region when a captured image is biased in a negative direction of an X axis, according to an embodiment.

FIG. 18 is a reference view for describing correction of a region, when a captured image is biased in a negative direction of an X axis, according to an embodiment.

Referring to FIG. 18, when a user captures a wall surface in front of a wall on which the display apparatus 200 is mounted by using the mobile device 100, the user may not locate the mobile device 100 right in front of the wall surface and may locate the mobile device 100 obliquely with respect to the x axis when capturing the wall surface, thereby generating an image 1800 via a camera of the mobile device 100.

The mobile device 100 may obtain an image 1830 by capturing a region 1820 including a left peripheral region of the display apparatus 200 by using markers 1801, 1802, 1803, and 1804 displayed on the display apparatus 200. Here, the mobile device 100 may extract a region 1840 corresponding to a shape of a polygon 1810 obtained by connecting the markers 1801, 1802, 1803, and 1804, from the captured image 1830. The extracted region 1840 may have a right side having a length h2 and a left side having a length h1, the length h1 being less than the length h2, and thus, an image of the extracted region 1840 may be distorted. Thus, the mobile device 100 may perform correction of extending the length h1 of the left side of the extracted region 1840 to be the same as the length h2 of the right side of the extracted region 1840, to obtain an image 1850, from which distortion is removed.

Next, the mobile device 100 may arrange a first image 1860 obtained by symmetrizing the corrected image 1850 based on a right side, at the left side of a background image area, and arrange a second image 1870 obtained by symmetrizing the first image 1860 based on a right side, at the right side of the background image area, to generate a background image 1880, in which distortion is corrected.

Figure 19:
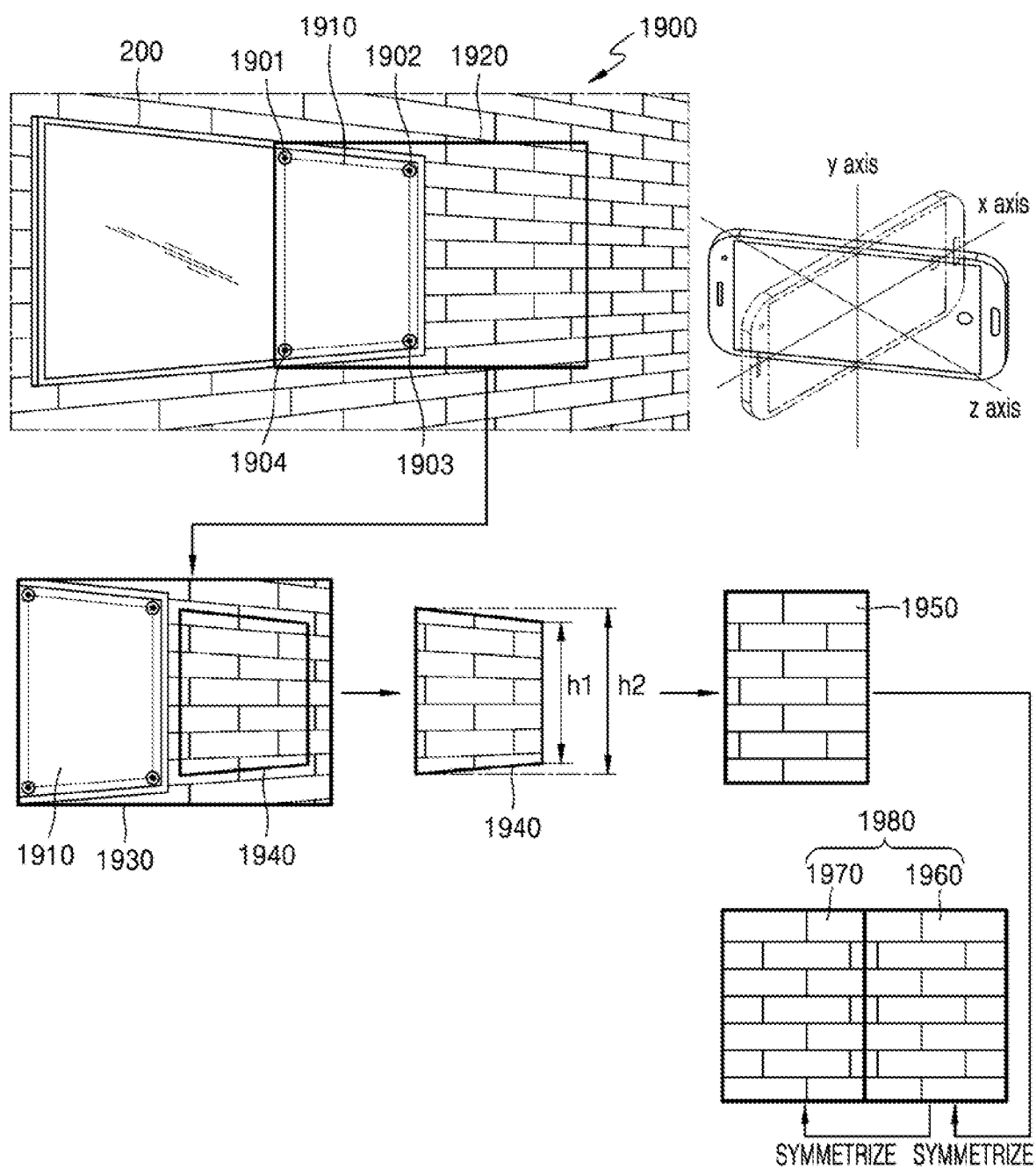
FIG. 19 is a reference view for describing correction of a region when a captured image is biased in a positive direction of an X axis, according to an embodiment.

FIG. 19 is a reference view for describing correction of a region, when a captured image is biased in a positive direction of an X axis, according to an embodiment.

Referring to FIG. 19, when a user captures a wall surface in front of a wall on which the display apparatus 200 is mounted by using the mobile device 100, the user may not locate the mobile device 100 right in front of the wall surface and may locate the mobile device 100 obliquely with respect to the x axis when capturing the wall surface, thereby generating an image 1900 via a camera of the mobile device 100.

The mobile device 100 may obtain an image 1930 by capturing a region 1920 including a right peripheral region of the display apparatus 200 by using markers 1901, 1902, 1903, and 1904 displayed on the display apparatus 200. Here, the mobile device 100 may extract a region 1940 corresponding to a shape of a polygon 1910 obtained by connecting the markers 1901, 1902, 1903, and 1904, from the captured image 1930. The extracted region 1940 may have a left side having a length h2 and a right side having a length h1, the length h1 being less than the length h2, and thus, an image of the extracted region 1940 may be distorted. Thus, the mobile device 100 may perform correction of extending the length h1 of the right side of the extracted region 1940 to be the same as the length h2 of the left side of the extracted region 1940, to obtain an image 1950, from which distortion is removed.

Next, the mobile device 100 may arrange a first image 1960 obtained by symmetrizing the corrected image 1950 based on a left side, at the right side of a background image area, and arrange a second image 1970 obtained by symmetrizing the first image 1960 based on a left side, at the left side of the background image area, to generate a background image 1980, in which distortion is corrected.

Figure 20:
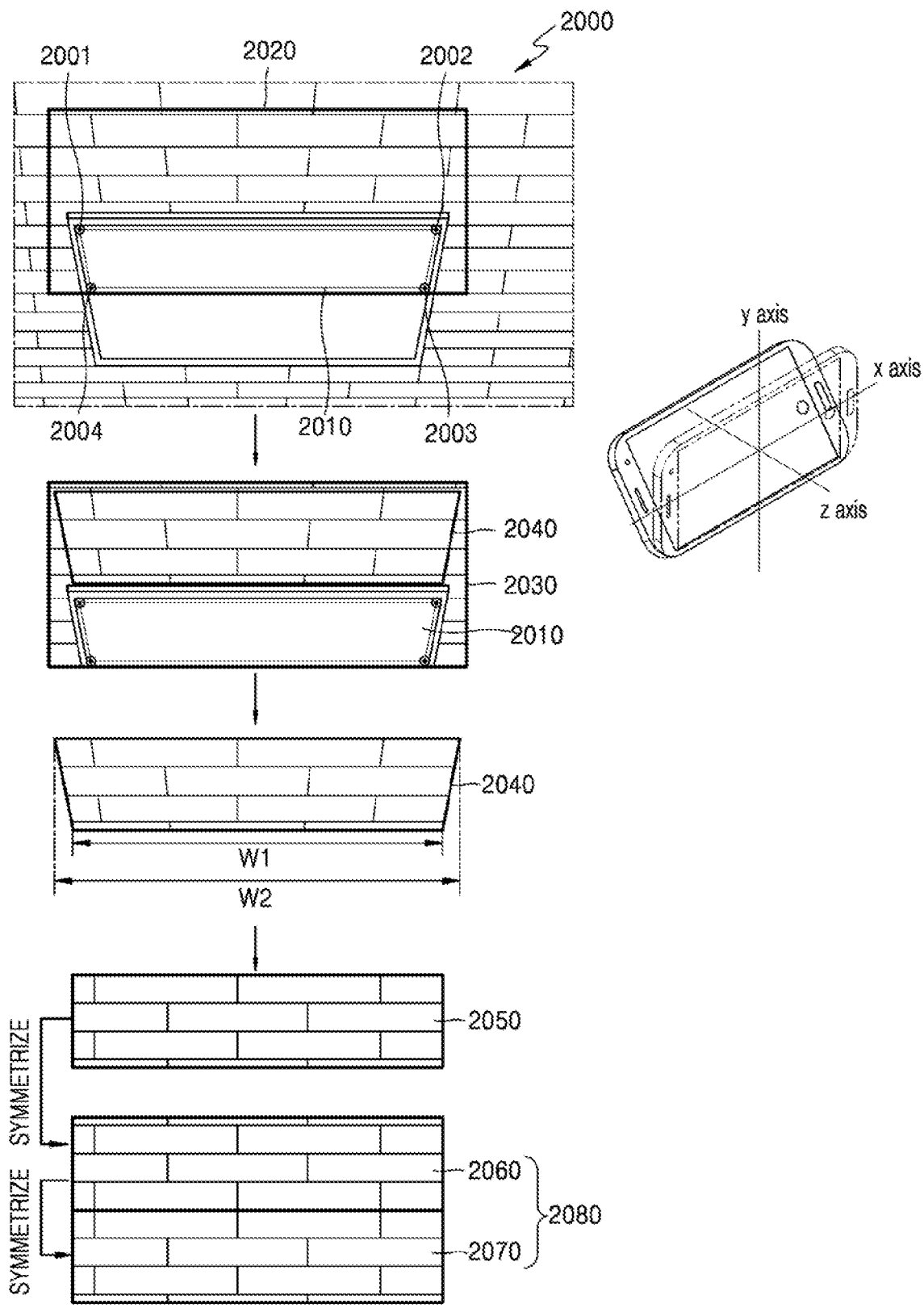
FIG. 20 is a reference view for describing correction of a region when a captured image is biased in a positive direction of a Y axis, according to an embodiment.

FIG. 20 is a reference view for describing correction of a region, when a captured image is biased in a positive direction of a Y axis, according to an embodiment.

Referring to FIG. 20, when a user captures a wall surface in front of a wall on which the display apparatus 200 is mounted by using the mobile device 100, the user may not locate the mobile device 100 right in front of the wall surface and may locate the mobile device 100 obliquely with respect to the y axis when capturing the wall surface, thereby generating an image 2000 via a camera of the mobile device 100.

The mobile device 100 may obtain an image 2030 by capturing a region 2020 including an upper peripheral region of the display apparatus 200 by using markers 2001, 2002, 2003, and 2004 displayed on the display apparatus 200. Here, the mobile device 100 may extract a region 2040 corresponding to a shape of a polygon 2010 obtained by connecting the markers 2001, 2002, 2003, and 2004, from the captured image 2030. The extracted region 1940 may have an upper side having a length w2 and a lower side having a length w1, the length w2 being greater than the length w1, and thus, an image of the extracted region 1940 may be distorted. Thus, the mobile device 100 may perform correction of reducing the length w2 of the upper side of the extracted region 2040 to be the same as the length w1 of the lower side of the extracted region 2040, to obtain an image 2050, from which distortion is removed.

Next, the mobile device 100 may arrange a first image 2060 obtained by symmetrizing the corrected image 2050 based on a lower side, at the upper side of a background image area, and arrange a second image 2070 obtained by symmetrizing the first image 2060 based on a lower side, at the lower side of the background image area, to generate a background image 2080, in which distortion is corrected.

Figure 21:
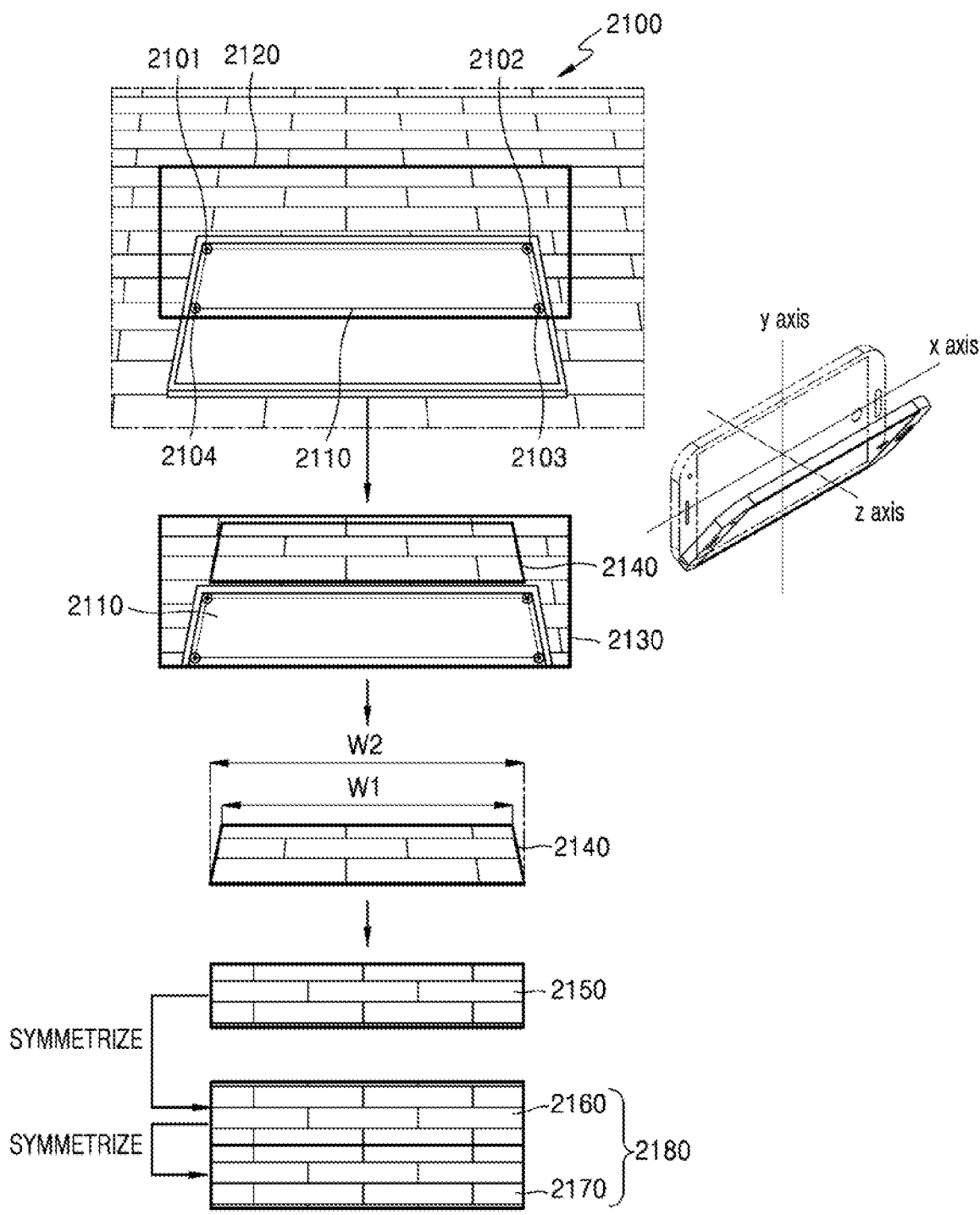
FIG. 21 is a reference view for describing correction of an area when a captured image is biased in a negative direction of a Y axis, according to an embodiment.

FIG. 21 is a reference view for describing correction of a region, when a captured image is biased in a negative direction of a Y axis, according to an embodiment.

Referring to FIG. 21, when a user captures a wall surface in front of a wall on which the display apparatus 200 is mounted by using the mobile device 100, the user may not locate the mobile device 100 right in front of the wall surface and may locate the mobile device 100 obliquely with respect to the y axis when capturing the wall surface, thereby generating an image 2100 via a camera of the mobile device 100.

The mobile device 100 may obtain an image 2130 by capturing a region 2120 including an upper peripheral region of the display apparatus 200 by using markers 2101, 2102, 2103, and 2104 displayed on the display apparatus 200. Here, the mobile device 100 may extract a region 2140 corresponding to a shape of a polygon 2110 obtained by connecting the markers 2101, 2102, 2103, and 2104, from the captured image 2130. The extracted region 2140 may have an upper side having a length w1 and a lower side having a length w2, the length w1 being less than the length w2, and thus, an image of the extracted region 2140 may be distorted. Thus, the mobile device 100 may perform correction of extending the length w1 of the upper side of the extracted region 2140 to be the same as the length w2 of the lower side of the extracted region 2140, to obtain an image 2150, from which distortion is removed.

Next, the mobile device 100 may arrange a first image 2160 obtained by symmetrizing the corrected image 2150 based on a lower side, at the upper side of a background image area, and arrange a second image 2170 obtained by symmetrizing the first image 2160 based on a lower side, at the lower side of the background image area, to generate a background image 2180, in which distortion is corrected.

Figure 22:
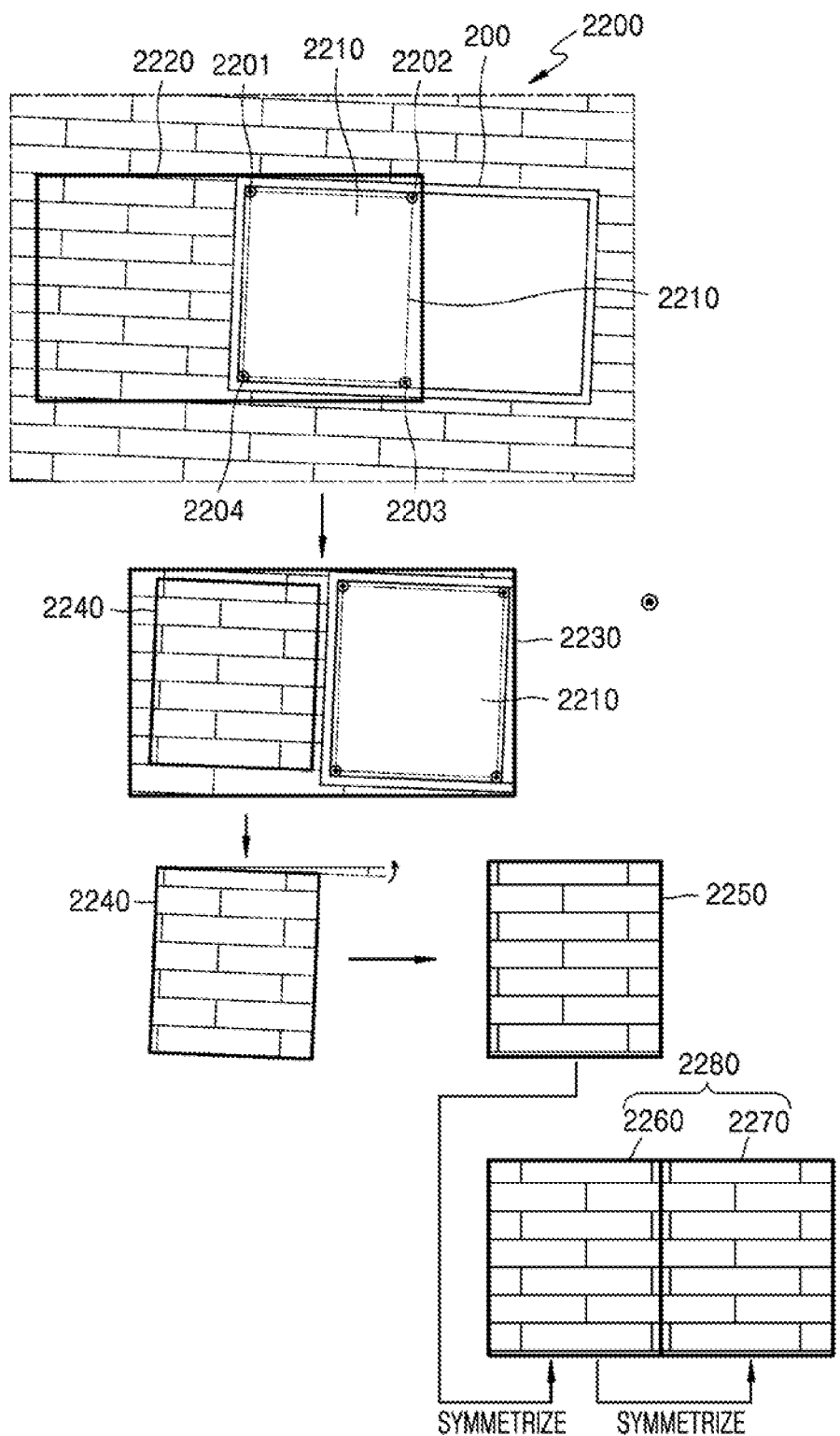
FIG. 22 is a reference view for describing correction of an area when a captured image is biased in a positive direction of a Z axis, according to an embodiment.

FIG. 22 is a reference view for describing a correction of an area, when a captured image is biased in a positive direction of a Z axis, according to an embodiment.

Referring to FIG. 22, when a user captures a wall surface in front of a wall on which the display apparatus 200 is mounted by using the mobile device 100, the user may not locate the mobile device 100 right in front of the wall surface and may locate the mobile device 100 obliquely with respect to a z axis when capturing the wall surface, thereby generating an image 2200 via a camera of the mobile device 100.

The mobile device 100 may obtain an image 2230 by capturing a region 2220 including a left peripheral region of the display apparatus 200 by using markers 2201, 2202, 2203, and 2204 displayed on the display apparatus 200. Here, the mobile device 100 may extract a region 2240 corresponding to a shape of a polygon 2210 obtained by connecting the markers 2201, 2202, 2203, and 2204, from the captured image 2230. The extracted region 2240 has an oblique angle, and thus, the extracted region 2240 may be rotated by the oblique angle to obtain an image 2250.

Next, the mobile device 100 may arrange a first image 2260 obtained by symmetrizing the corrected image 2250 based on a right side, at the left side of a background image area, and arrange a second image 2270 obtained by symmetrizing the first image 2260 based on a right side, at the right side of the background image area, to generate an image 2280, in which distortion is corrected.

Figure 23:
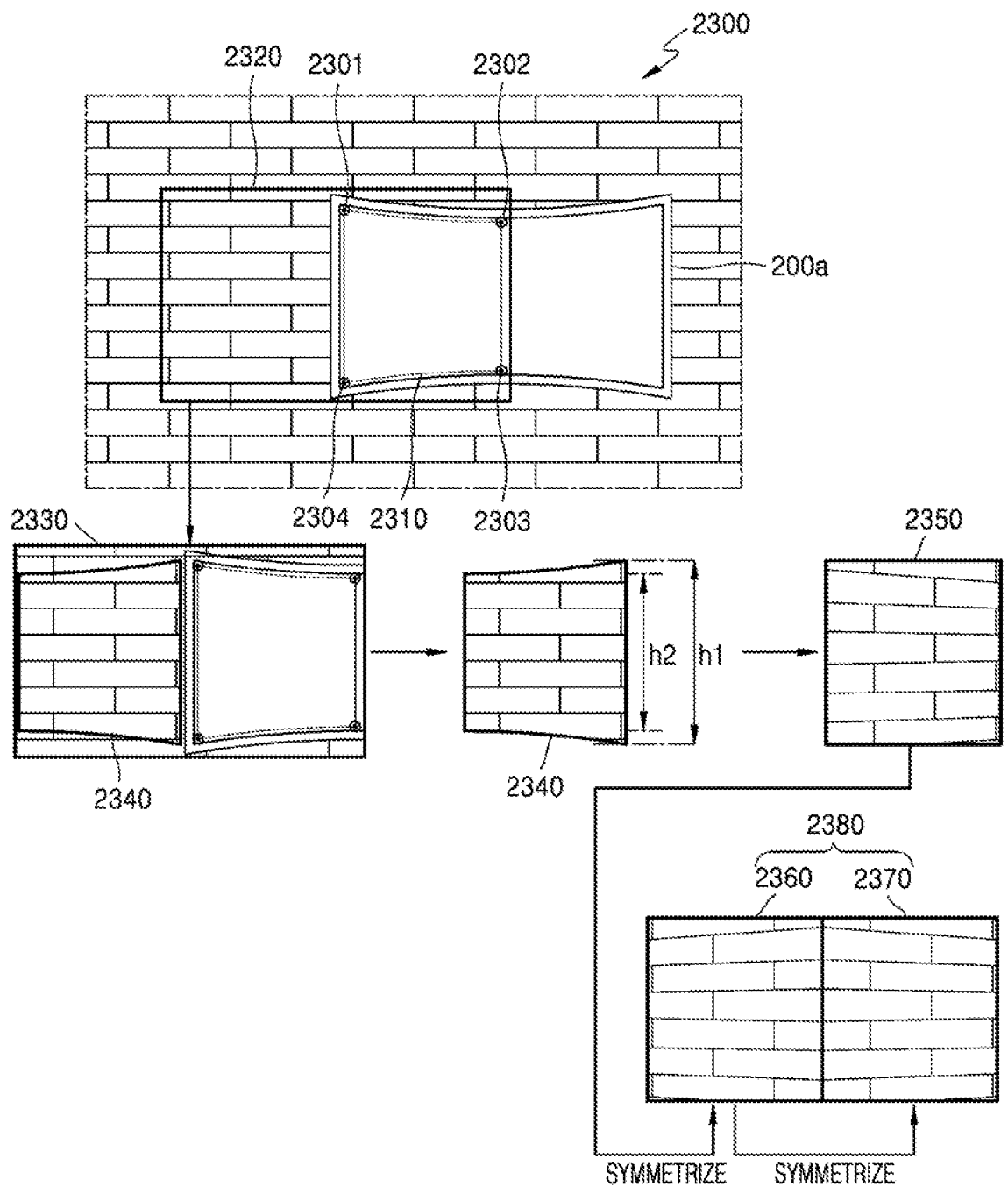
FIG. 23 is a reference view for describing an application example of a curved display apparatus, according to an embodiment.

FIG. 23 is a reference view for describing an application example of a curved display apparatus, according to an embodiment.

When a background image extracted from a wall surface image is applied to the curved display apparatus, due to a curvature of the curved display apparatus, the background image extracted by normally capturing a background area may not be harmonized with the background area, looking awkward, since both end portions of the curved display apparatus are farther apart from a wall than a central portion thereof. Thus, in the case of the curved display apparatus, a background image having an intentional convex center may be generated and applied, in order to make the both ends of the curved display look harmonized with the wall surface.

Referring to FIG. 23, when a user captures a wall surface in front of a wall on which a display apparatus 200a is mounted by using the mobile device 100, the user may locate the mobile device 100 right in front of the wall surface when capturing the wall surface, thereby generating an image 2300 via a camera of the mobile device 100.

The mobile device 100 may obtain an image 2330 by capturing a region 2320 including a left peripheral region of the display apparatus 200 by using markers 2301, 2302, 2303, and 2304 displayed on the display apparatus 200a. Here, the mobile device 100 may extract a region 2340 corresponding to a shape of a polygon 2310 obtained by connecting the markers 2301, 2302, 2303, and 2304, from the captured image 2330. The extracted region 2340 may have a right side having a length h1 and a left side having a length h2, the length h2 being less than the length h1, and thus, an image of the extracted region 2340 may be distorted. Thus, the mobile device 100 may perform correction of extending the length h2 of the left side of the extracted region 2340 to be the same as the length h1 of the right side of the extracted region 2340, to obtain an image 2350, from which distortion is removed.

Next, the mobile device 100 may arrange a first image 2360 obtained by symmetrizing the corrected image 2350 based on a right side, at the left side of a background image area, and arrange a second image 2370 obtained by symmetrizing the first image 2360 based on a right side, at the right side of the background image area, to generate a background image 2380, in which distortion is corrected.

In FIG. 23, a central portion of the background image 2380 that is finally generated is convex. When this background image 2380 is displayed on the curved display apparatus 200a, due to the characteristics in which both ends portions of the curved display apparatus 200a are farther apart from a wall than a central portion of the curved display apparatus 200a, the wall surface and the background image of the curved display apparatus 200a may be displayed to be naturally connected.

As described above, when a user captures a wall surface in a state in which a mobile device is obliquely located with respect to the wall surface, it is highly probable that a defective image which is not usable is generated, and thus, capturing may have to be performed again. However, according to the embodiments described above, an image, generated by adjusting a region to be captured by using an oblique angle in an oblique image without recapturing the image, may be used as a background image of the display apparatus.

Also, when a generated background image is applied to a curved display apparatus, both ends of the curved display apparatus may not be smoothly connected with a wall surface and may seem awkward, due to a curvature of the curved display apparatus. However, in this case, a background image having a convex central portion may be generated and may be applied to the curved display apparatus, so that the background image may be naturally displayed on the curved display apparatus.

The operating methods of the mobile device, the display apparatus, and the server according to the embodiments may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the disclosure or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

While the embodiments are described in detail, the scope of the claims of the disclosure is not limited thereto. The scope of the claims of the disclosure includes various modifications and alternate forms made by one of ordinary skill in the art using the concept of the disclosure defined by the following claims.

The invention claimed is:

1. An electronic device comprising:
a camera;
a display;

a communication interface;

a memory storing one or more instructions; and a processor configured to execute the one or more instructions stored in the memory to:

generate an event and transmit, to a display apparatus, the generated event to instruct a plurality of markers to be displayed on a screen of the display apparatus;

determine, from among images obtained from the camera, an image, from which at least a region of a wall surface in the vicinity of the display apparatus is to be extracted, based on recognition of the plurality of markers displayed on the screen of the display apparatus in response to the generated event;

extract, from the determined image, a region corresponding to a shape obtained based on the recognized plurality of markers;

generate a background image to be displayed on the screen of the display apparatus, by correcting an image of the extracted region; and transmit the generated background image to the display apparatus so that the generated background image is displayed on the screen of the display apparatus.

2. The electronic device of claim 1, wherein the processor is further configured to execute the one or more instructions to:

obtain size information of the screen of the display apparatus; and determine, based on the obtained size information, a location of the screen of the display apparatus on which the plurality of markers are to be displayed, and generate the event including information about the determined location.

3. The electronic device of claim 1, wherein the processor is further configured to execute the one or more instructions to, when the plurality of markers displayed on the screen of the display apparatus are recognized, determine, from the images obtained from the camera, an image in which the plurality of markers exist, as an image from which the background image is to be extracted.

4. The electronic device of claim 1, wherein the at least the region of the wall surface on which the display apparatus is mounted includes at least one of a left region, a right region, an upper region, and a lower region of the wall surface in the vicinity of the display apparatus.

5. The electronic device of claim 1, wherein the processor is further configured to execute the one or more instructions to correct the image of the extracted region by performing at least one of adjusting of a length of at least one side of the image, rotating the image of the extracted region, and symmetrizing the image of the extracted region.

6. The electronic device of claim 1, wherein the processor is further configured to execute the one or more instructions to generate the background image by combining an image generated by correcting the image of the extracted region with a symmetric image of the corrected image.

7. The electronic device of claim 6, wherein the processor is further configured to execute the one or more instructions to:

when the determined image is an image obtained from a left region or a right region of the wall surface in the vicinity of the display apparatus, obtain the symmetric image by symmetrizing the obtained image in a left direction or a right direction; and when the determined image is an image obtained from an upper region or a lower region of the wall surface in the vicinity of the display apparatus, obtain the symmetric image by symmetrizing the obtained image in an upper direction or a lower direction.

8. The electronic device of claim 1, wherein the processor is further configured to execute the one or more instructions to transmit the event and the background image to the display apparatus via a server.

9. The electronic device of claim 1, wherein the shape obtained based on the recognized plurality of markers includes a polygonal shape obtained by connecting the recognized plurality of markers.

10. An operating method of an electronic device, the method comprising:

generating an event to instruct a plurality of markers to be displayed on a screen of a display apparatus and transmitting the generated event to the display apparatus;

determining, from among images obtained from a camera, an image, from which at least a region of a wall surface in the vicinity of the display apparatus is to be extracted, via recognition of the plurality of markers displayed on the screen of the display apparatus in response to the generated event;

extracting, from the determined image, a region corresponding to a shape obtained based on the recognized plurality of markers;

generating a background image to be displayed on the screen of the display apparatus, by correcting an image of the extracted region; and transmitting the generated background image to the display apparatus so that the generated background image is displayed on the screen of the display apparatus.

11. The method of claim 10, further comprising:

obtaining size information of the screen of the display apparatus; and determining, based on the obtained size information, a location of the screen of the display apparatus on which the plurality of markers are to be displayed, and generating the event including information about the determined location.

12. The method of claim 10, further comprising:

recognizing the plurality of markers displayed on the screen of the display apparatus, from the images obtained from the camera; and determining an image, in which the recognized plurality of markers exist, as an image from which the background image is to be extracted.

13. The method of claim 10, wherein the at least the region of the wall surface on which the display apparatus is mounted includes at least one of a left region, a right region, an upper region, and a lower region of the wall surface in the vicinity of the display apparatus.

14. The method of claim 10, further comprising, with respect to the image of the extracted region, correcting the image of the extracted region by performing at least one of adjusting a length of at least one side of the image, rotating the image of the extracted region, and symmetrizing the image of the extracted region.

15. A non-transitory computer-readable recording medium having recorded thereon a program for executing the method of claim 10 on a computer.

* * * * *